(12) United States Patent
Desrochers et al.

(10) Patent No.: US 10,578,466 B2
(45) Date of Patent: Mar. 3, 2020

(54) FLUID INJECTOR TESTING SYSTEM

(71) Applicant: GROUPE MELOCHE INC., Salaberry-de-Valleyfield (CA)

(72) Inventors: Guillaume Desrochers, Beauharnois (CA); Melick Proulx, Salaberry-de-Valleyfield (CA); Sami Rahal, Montreal (CA)

(73) Assignee: GROUPE MELOCHE INC., Salaberry-de-Valleyfield (CA)

( * ) Notice: Subject to any disclaimer, the term of this patent is extended or adjusted under 35 U.S.C. 154(b) by 158 days.

(21) Appl. No.: 15/816,564

(22) Filed: Nov. 17, 2017

(65) Prior Publication Data
US 2019/0154476 A1 May 23, 2019

(51) Int. Cl.
*G01F 1/00* (2006.01)
*F02M 65/00* (2006.01)
(Continued)

(52) U.S. Cl.
CPC ............ *G01F 1/007* (2013.01); *F02M 65/001* (2013.01); *F02M 65/008* (2013.01); *G01F 5/00* (2013.01); *F01M 1/08* (2013.01)

(58) Field of Classification Search
CPC .............. G01F 1/00; G01F 5/00; F02M 65/00
(Continued)

(56) References Cited

U.S. PATENT DOCUMENTS

| | | | | |
|---|---|---|---|---|
| 3,511,087 A | * | 5/1970 | Taylor | .................... F02M 65/00 |
| | | | | 73/114.38 |
| 4,453,403 A | * | 6/1984 | Bussey | ..................... G01F 3/04 |
| | | | | 73/114.45 |

(Continued)

FOREIGN PATENT DOCUMENTS

| CN | 204344343 U | 5/2015 |
|---|---|---|
| CN | 105201719 A | 12/2015 |

(Continued)

OTHER PUBLICATIONS

Polish Search Report from corresponding application No. PL424551 dated Nov. 8, 2018.
(Continued)

*Primary Examiner* — Nimeshkumar D Patel
*Assistant Examiner* — Jean F Morello
(74) *Attorney, Agent, or Firm* — BCF LLP

(57) ABSTRACT

An injector testing system includes a testing rig having a receptacle and an injector mounting structure. The receptacle has an inlet for receiving fluid injected by an injector, a target outlet for receiving at least a portion of fluid injected through the inlet, and a runoff outlet for receiving fluid missing the target outlet. At least one fluid-quantity measuring device fluidly connected to at least one of the target and runoff outlets measures a quantity of fluid having flowed thereto. A controller receives signals representative of (i) a quantity of fluid having flowed to the at least one fluid-quantity measuring device via the target outlet, and (ii) a quantity of fluid having flowed to the at least one fluid-quantity measuring device via the runoff outlet or both of the runoff outlet and the target outlet. Based on these quantities, a proportion of fluid injected into the target outlet is determined.

21 Claims, 14 Drawing Sheets

(51) Int. Cl.
*G01F 5/00* (2006.01)
*F01M 1/08* (2006.01)

(58) Field of Classification Search
USPC .............................. 73/114.45, 114.51, 152.39
See application file for complete search history.

(56) References Cited

U.S. PATENT DOCUMENTS

| | | | |
|---|---|---|---|
| 6,053,037 | A | 4/2000 | Kojima et al. |
| 9,170,141 | B2 | 10/2015 | Lee et al. |
| 2010/0170329 | A1* | 7/2010 | Greeves ............... F02M 65/001 |
| | | | 73/114.45 |
| 2013/0186605 | A1 | 7/2013 | Schoenfeld et al. |

FOREIGN PATENT DOCUMENTS

| | | | | |
|---|---|---|---|---|
| CN | 106769067 | A | 5/2017 | |
| EP | 0861979 | A2 * | 9/1998 | ............. F02M 65/00 |
| KR | 101712737 | B1 | 3/2017 | |

OTHER PUBLICATIONS

English abstract from CN105201719 retrieved from Espacenet on Nov. 23, 2018.
Evers, L., Tampas, P., Whipple, R., and Fried, M., "An Automated Patternator for Fuel Injector Sprays," SAE Technical Paper 960108, 1996.
English translation of CN106769067 retrieved from Espacenet.
English translation of CN204344343 retrieved from Espacenet.
English translation of KR101712737 retrieved from Espacenet.

* cited by examiner

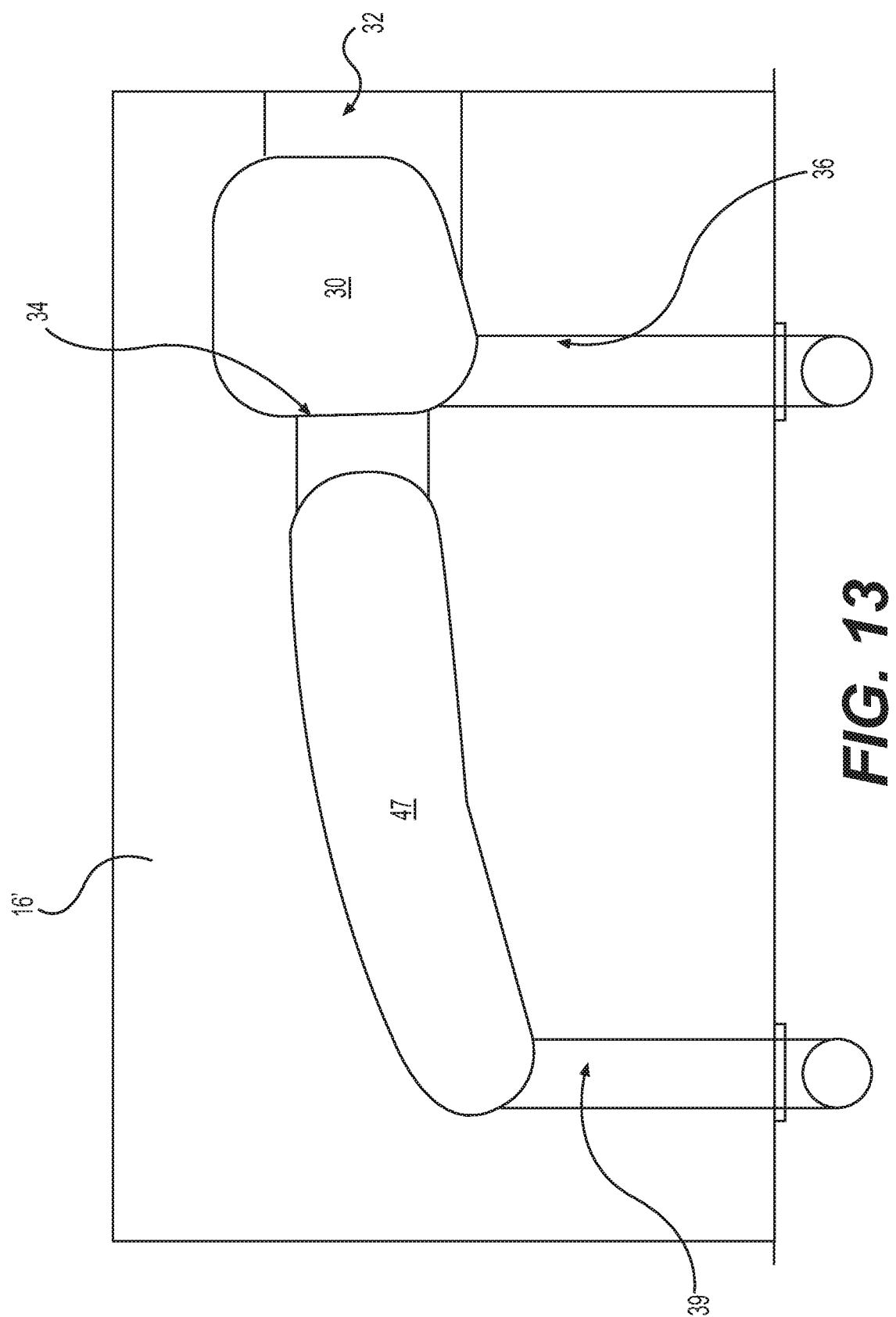

FLUID INJECTOR TESTING SYSTEM

FIELD OF TECHNOLOGY

The present technology relates to testing systems for testing fluid injectors.

BACKGROUND

Fluid injectors, such as oil injectors, are used in various applications for injecting a fluid towards a targeted area. For instance, in some cases, an engine can be lubricated by an oil injector that injects oil into a chamber.

For purposes of quality control, such fluid injectors are often tested during production in order to ensure their accuracy such that, in use, the area targeted by the injector will receive an adequate amount of fluid. To that end, injectors are typically tested by injecting fluid towards a target and visually gauging if the fluid has hit the intended target. However, due to its visual nature, such a testing process cannot accurately ascertain the proportion of fluid hitting the intended target.

There is therefore a desire for a fluid injector testing system that can overcome at least in part this drawback.

SUMMARY

It is an object of the present technology to ameliorate at least some of the inconveniences present in the prior art.

According to one aspect of the present technology, there is provided an injector testing system including a testing rig. The testing rig includes a receptacle defining an inner chamber. The receptacle has an inlet for receiving fluid to be injected by an injector to be tested, a target outlet for receiving at least a portion of fluid to be injected through the inlet, and a runoff outlet for receiving fluid to be injected by the injector that misses the target outlet. The inlet, the target outlet and the runoff outlet open into the inner chamber. The target outlet is across from the inlet. The testing rig also includes an injector mounting structure configured for mounting the injector to be tested outside of the receptacle. The injector testing system also includes at least one fluid-quantity measuring device fluidly connected to at least one of the target outlet and the runoff outlet. The at least one fluid-quantity measuring device is configured to measure a quantity of fluid having flowed thereto from the at least one of the target outlet and the runoff outlet. The injector testing system also includes a testing controller in communication with the at least one fluid-quantity measuring device. The testing controller is configured to receive signals from the at least one fluid-quantity measuring device representative of (i) a first quantity of fluid having flowed to the at least one fluid-quantity measuring device via the target outlet, and (ii) a second quantity of fluid having flowed to the at least one fluid-quantity measuring device via one of the runoff outlet and both of the runoff outlet and the target outlet. The testing controller is also configured to, based on the first and second quantities, determine a proportion of fluid that has been injected into the target outlet of the receptacle.

In some implementations of the present technology, the at least one of the runoff outlet and both of the runoff outlet and the target outlet is the runoff outlet.

In some implementations of the present technology, the at least one fluid-quantity measuring device includes: a first fluid-quantity measuring device fluidly connected to the target outlet and configured to measure the first quantity of fluid; and a second fluid-quantity measuring device fluidly connected to the runoff outlet and configured to measure the second quantity of fluid.

In some implementations of the present technology, the first fluid-quantity measuring device is a first scale configured to measure a first weight of fluid collected in the first scale. The first quantity is the first weight. The second fluid-quantity measuring device is a second scale configured to measure a second weight of fluid collected in the second scale. The second quantity is the second weight.

In some implementations of the present technology, the injector testing system includes a table including a plurality of fluid collectors for collecting fluid flowing out of the receptacle. A first one of the fluid collectors fluidly communicates with the target outlet and is fluidly connected to the first scale such as to funnel fluid from the target outlet to the first scale. A second one of the fluid collectors fluidly communicates with the runoff outlet and is fluidly connected to the second scale such as to funnel fluid from the runoff outlet to the second scale.

In some implementations of the present technology, the testing rig is adjustably mounted to the table such as to align and fluidly communicate (i) the first scale to the target outlet via the first one of the fluid collectors, and (ii) the second scale to the runoff outlet via the second one of the fluid collectors.

In some implementations of the present technology, the table has a plurality of guiding recesses. The testing rig includes platform. The receptacle and the injector mounting structure are mounted to the platform. The testing rig is adjustably mounted to the table via a plurality of clamps that slidingly engage the guiding recesses of the table and are clamped to the platform of the testing rig.

In some implementations of the present technology, the injector testing system also includes a tank for containing fluid and a pump configured to pump fluid from the tank to the injector to be tested.

In some implementations of the present technology, the table has an inlet connection. The pump is configured to be fluidly connected to the injector to be tested via the inlet connection of the table.

In some implementations of the present technology, the runoff outlet of the receptacle is located vertically below the target outlet at a lowest point of the inner chamber such that fluid that misses the target outlet flows by gravity to the runoff outlet.

In some implementations of the present technology, the injector testing system also includes a pump selectively fluidly connected to the first and second scales for purging fluid from the first and second scales. The testing controller is in communication with the pump and being configured to control the pump to selectively purge the first and second scales.

In some implementations of the present technology, the testing controller controls the pump to stop purging the first scale when fluid contained in the first scale weighs less than a first weight threshold that is equal to or less than 5% of the first weight. The testing controller controls the pump to stop purging the second scale when fluid contained in the second scale weighs less than a second weight threshold that is equal to or less than 5% of the second weight.

In some implementations of the present technology, the injector testing system also includes a compressor adapted for selectively supplying compressed air into the injector to be tested to clear the injector of fluid.

In some implementations of the present technology, the injector testing system also includes a user interface in communication with the testing controller. The user interface is configured to communicate to a user one or more of the first quantity, the second quantity and the proportion of fluid.

In some implementations of the present technology, the injector testing system also includes: a pressure sensor configured to sense a pressure of fluid to be supplied to the injector to be tested; a temperature sensor configured to sense a temperature of fluid to be supplied to the injector to be tested; and a flow rate sensor configured to sense a flow rate of fluid to be supplied to the injector to be tested. The user interface is configured to display the pressure, the temperature and the flow rate.

In some implementations of the present technology, the injector testing system also includes a cover for selectively enclosing the testing rig and a fluid mist collector mounted to the cover for extracting fluid mist.

In some implementations of the present technology, the injector testing system also includes: a tank for containing fluid; a pump configured to pump fluid from the first and second scales to the tank; a first valve fluidly connected between the first one of the fluid collectors and the first scale to selectively direct flow of fluid from the first one of the fluid collectors toward the tank or the first scale; a second valve fluidly connected between the second one of the fluid collectors and the second scale to selectively direct flow of fluid from the second one of the fluid collectors toward the tank or the second scale; a third valve fluidly connected between the first scale and the pump to selectively block flow of fluid out of the first scale to the pump; and a fourth valve fluidly connected between the second scale and the pump to selectively block flow of fluid out of the second scale to the pump.

In some implementations of the present technology, the testing rig is a first testing rig, the injector testing system includes a second testing rig. The second testing rig includes a second receptacle defining a second inner chamber. The second receptacle has a second inlet for receiving fluid to be injected by a second injector to be tested, a second target outlet for receiving at least a portion of fluid to be injected through the second inlet, and a second runoff outlet for receiving fluid to be injected by the injector that misses the second target outlet. The second inlet, the second target outlet and the second runoff outlet open into the second inner chamber. The second target outlet is across from the second inlet. The second testing rig also includes a second injector mounting structure configured for mounting the second injector to be tested outside of the second receptacle. The at least one fluid-quantity measuring device includes a third scale fluidly connected to the second target outlet and configured to measure a third weight of fluid collected in the third scale, and a fourth scale fluidly connected to the second runoff outlet and configured to measure a fourth weight of fluid collected in the fourth scale. A third one of the fluid collectors fluidly communicates with the second target outlet and is fluidly connected to the third scale such as to funnel fluid from the second target outlet to the third scale. A fourth one of the fluid collectors fluidly communicates with the second runoff outlet and is fluidly connected to the fourth scale such as to funnel fluid from the second runoff outlet to the fourth scale.

According to another aspect of the present technology, there is provided a method of testing an injector. The method includes positioning the injector to inject fluid towards an inlet and a target outlet of a receptacle. The inlet and target outlet fluidly communicate with an inner chamber of the receptacle. The target outlet is across from the inlet. The method also includes injecting fluid via the injector toward the target outlet via the inlet of the receptacle, measuring a first quantity of fluid passing through the target outlet, and measuring a second quantity of fluid that is one of (i) fluid that misses the target outlet and passes through a runoff outlet of the receptacle, and (ii) both fluid passing through the target outlet and fluid that misses the target outlet and passes through the runoff outlet of the receptacle. The method also includes, based on the first and second quantities, determining a proportion of fluid that has been injected into the target outlet of the receptacle.

According to another aspect of the present technology, there is provided an injector testing rig for testing an injector. The injector testing rig includes a receptacle defining an inner chamber. The receptacle has an inlet for receiving fluid to be injected by the injector, a target outlet for receiving at least a portion of fluid to be injected through the inlet, and a runoff outlet for receiving fluid to be injected by the injector that misses the target outlet. The target outlet is located across from the inlet. The runoff outlet is disposed vertically below the target outlet.

In some implementations of the present technology, the injector testing rig also includes an injector mounting structure configured for mounting the injector to be tested outside of the receptacle.

In some implementations of the present technology, the runoff outlet is disposed at a lowest point of the inner chamber.

Explanations and/or definitions of terms provided in the present application take precedence over explanations and/or definitions of these terms that may be found in the document incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 13 is a central cross-sectional view of a receptacle of the testing rig of FIG. 12.

DETAILED DESCRIPTION

Figure 1:
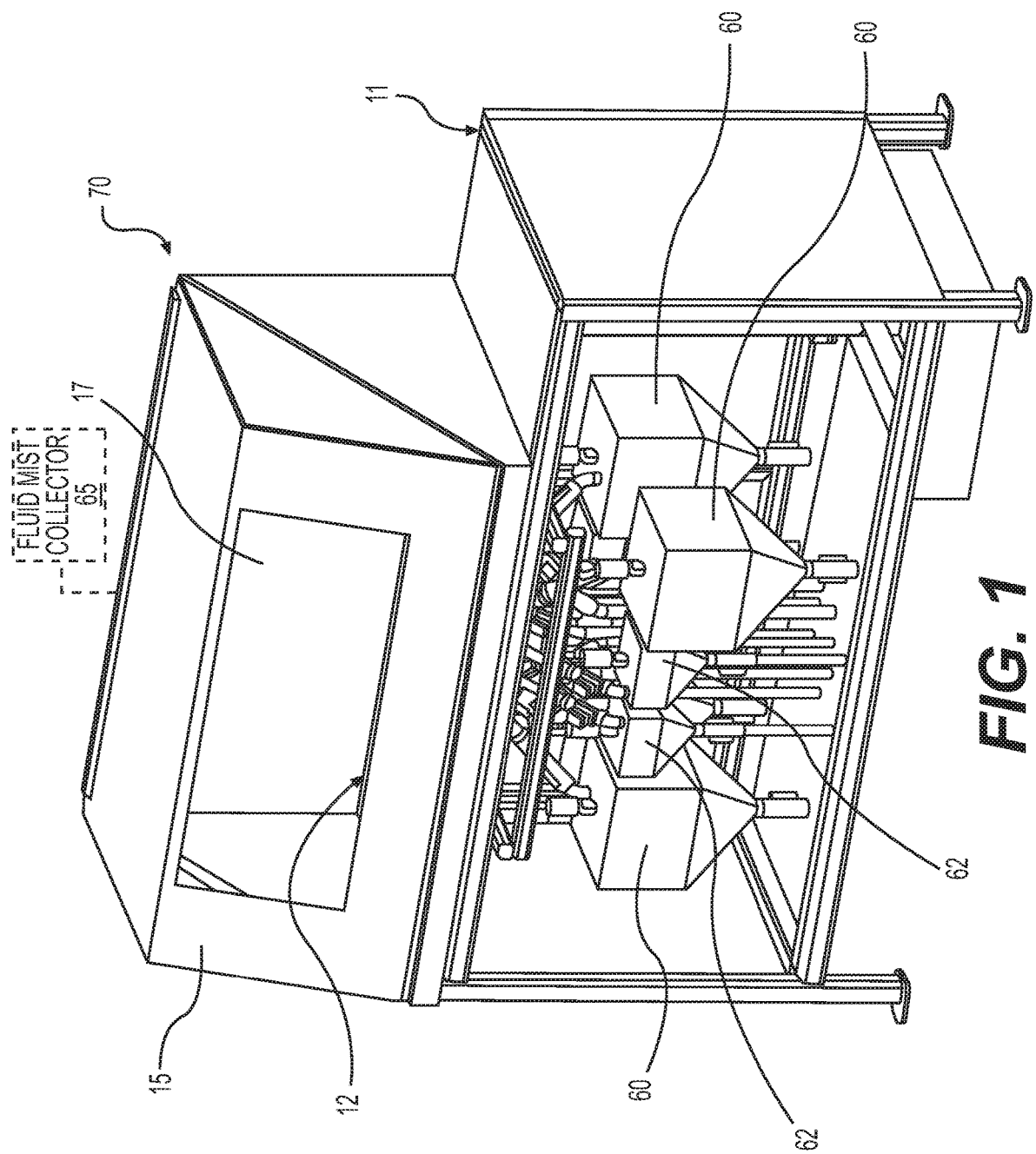
FIG. 1 is a top, left, perspective view of an injector testing system according to the present technology.

An injector testing system 10, as illustrated in FIG. 1, is configured for testing a fluid injector 18 (FIG. 2) such as to evaluate the accuracy of its fluid injection. In this example, the injector 18 is an oil injector used to inject oil in an engine (e.g., for lubrication of components thereof). However, it is contemplated that the injector 18 may inject fluids other than oil in other examples (e.g., water). Moreover, it should be understood that the injector 18 could have a construction other than the one illustrated.

Figure 2:
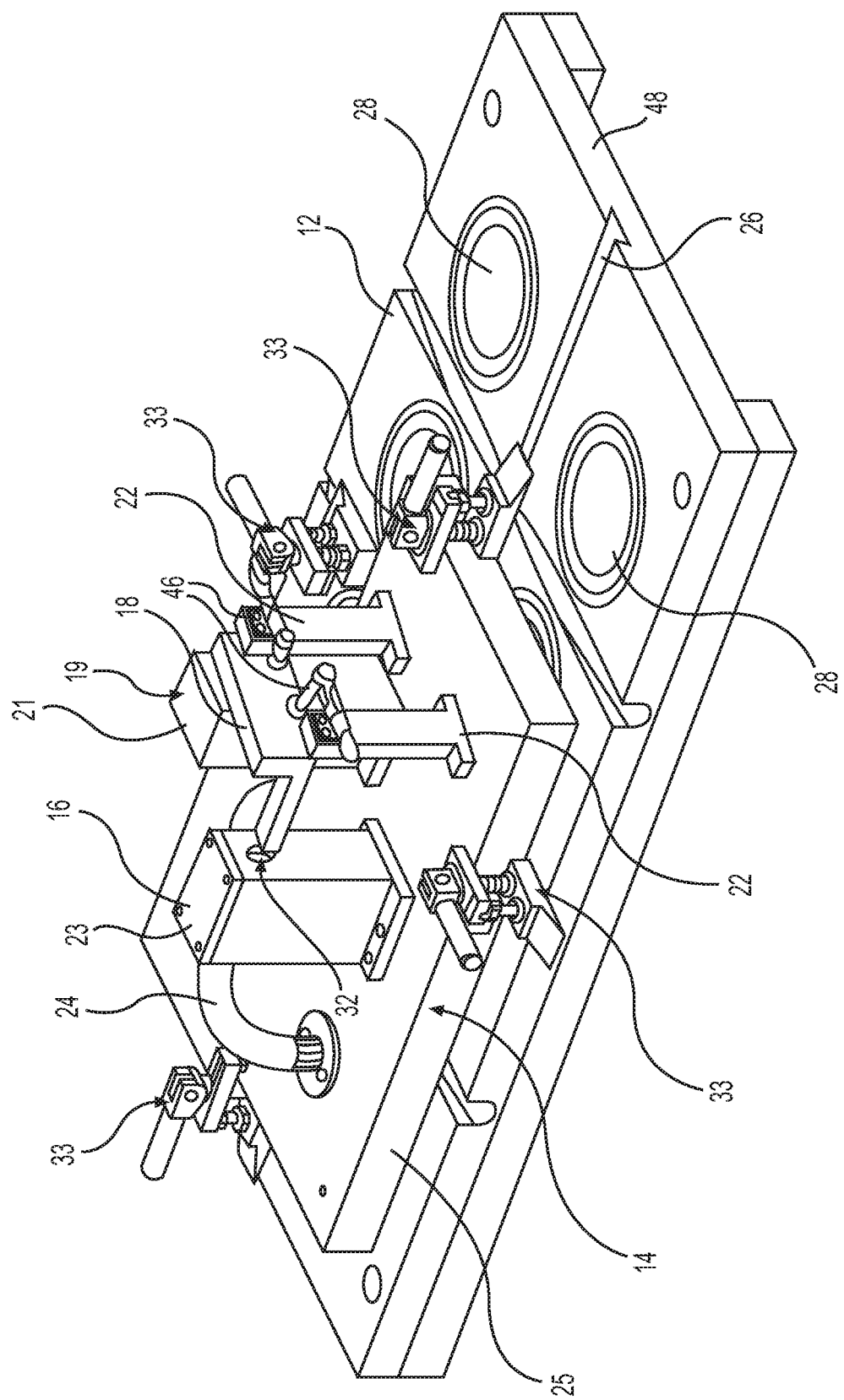
FIG. 2 is a top, left, perspective view of a table and a testing rig of the injector testing system of FIG. 1.

With reference to FIGS. 1 and 2, the injector testing system 10 comprises a bench 11 having a table 12 to which a testing rig 14 is mounted. As best seen in FIG. 2, the testing rig 14 includes a receptacle 16 into which the injector 18 injects fluid, an injector mounting structure 19 for mounting the injector 18 outside of the receptacle 16, and a platform 25 onto which the receptacle 16 and the injector mounting structure 19 are affixed.

A cover 15 is provided for selectively enclosing the testing rig 14 such as to prevent the propagation of fluid into the ambient environment of the injector testing system 10. The cover 15 has a window 17 to allow a user to visualize the testing rig 14 therethrough. In addition, a fluid mist collector 65 (schematically illustrated in FIGS. 1 and 7) is mounted to the cover 15 for extracting fluid mist that is produced by the injection of fluid by the injector 18.

Figure 8:
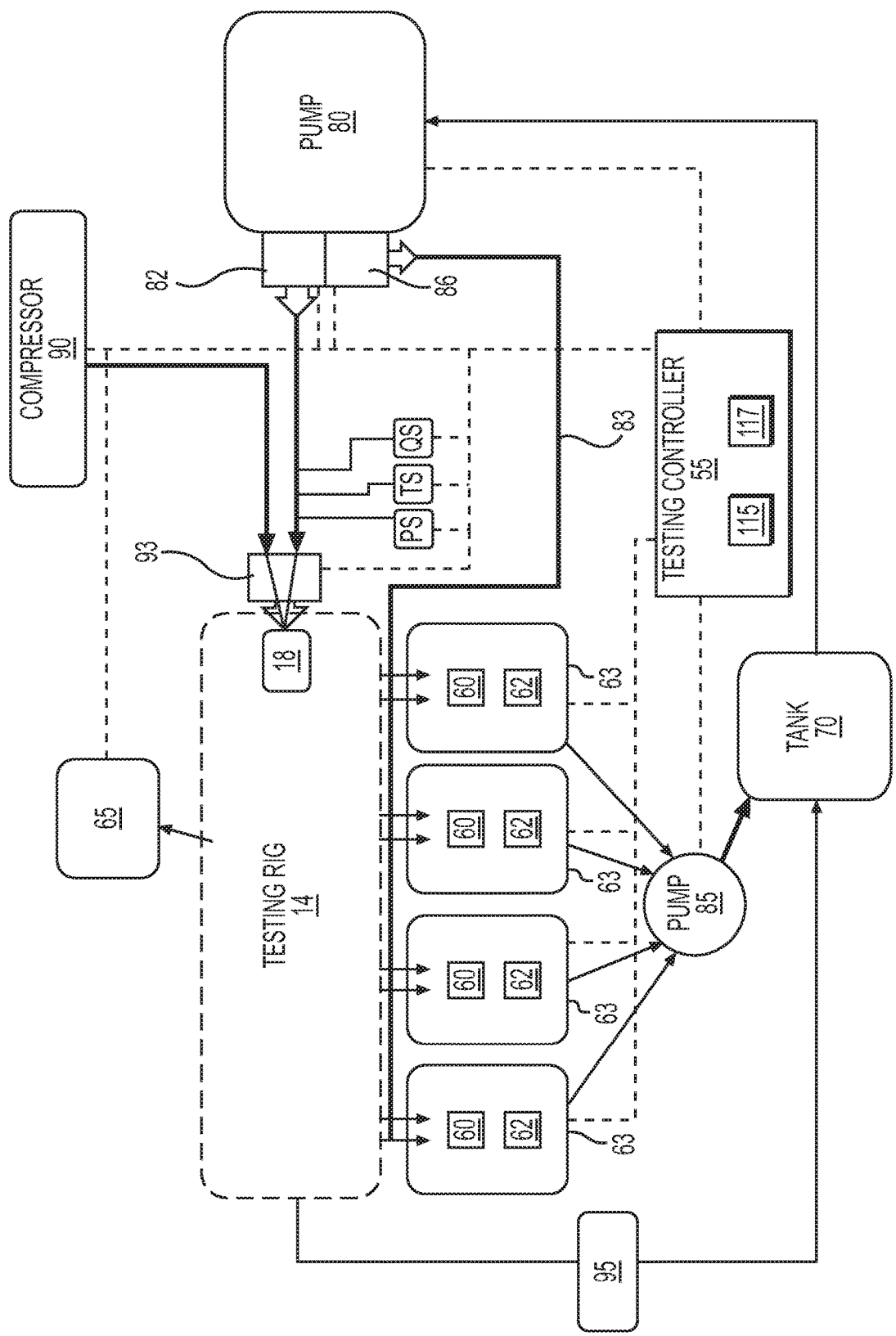
FIG. 8 is a schematic illustration of the injector testing system of FIG. 1.

As shown in FIG. 8, the injector testing system 10 also comprises a tank 70 for containing fluid and a pump 80 for pumping fluid from the tank 70 to the injector 18 to be tested. In addition, a compressor 90 is adapted for selectively supplying compressed air into the injector 18 to be tested to clear the injector 18 of fluid.

With reference to FIG. 2, in this implementation, the injector mounting structure 19 includes a main support 21 and two secondary supports 22. Each of the supports 21, 22 is configured to support the injector 18 to be tested. Notably, the injector 18 is mounted to the supports 22 by a securing member 46 which is fastened to a respective one of the supports 22 and to the injector 18. As will be described further below, the main support 21 defines a conduit (not shown) through which fluid can be supplied to the injector 18.

Figure 3A:
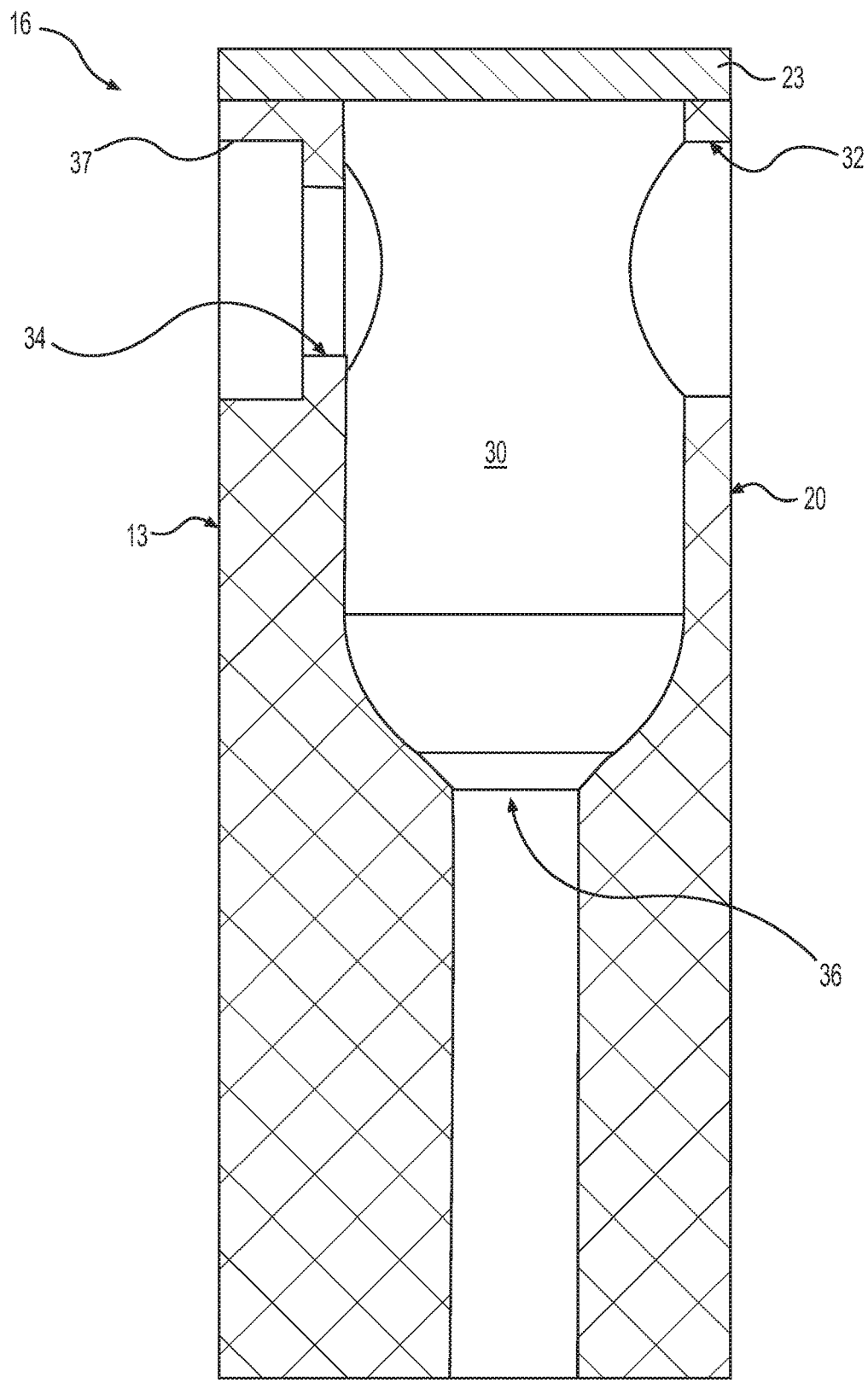
FIG. 3A is a central cross-sectional view of a receptacle of the testing rig.

The receptacle 16 is used to define a target for the injector 18 to inject fluid therein, and to separate fluid that reaches the target from fluid that misses the target. To that end, as shown in FIG. 3, the receptacle 16 defines an inner chamber 30 and has an inlet 32 and a pair of outlets 34, 36 that open into the inner chamber 30. In this implementation, the inner chamber 30 is generally cylindrical with a generally hemispherical lower portion. However, it is contemplated that the inner chamber 30 could have any other suitable shape in other implementations. The receptacle 16 has a cover 23 for closing the top end of the inner chamber 30. In this implementation, the cover 23 is fastened to the lower portion of the receptacle 16. It is contemplated that the cover 23 could be made integrally with the remainder of the receptacle 16.

The inlet 32 receives fluid injected by the injector 18 from outside of the receptacle 16. The outlet 34, which is across from the inlet 32, is targeted by the injection of fluid by the injector 18. That is, the injector 18 is positioned, via the injector mounting structure 19, to target the injection of fluid into the outlet 34. The outlet 34 may thus be referred to as a "target outlet" in that it is the outlet of the receptacle 16 that is targeted by the injector 18 during testing such that the target outlet 34 receives at least a portion of fluid to be injected through the inlet 32. The outlet 36 is disposed vertically below the target outlet 34, at a lowest point of the inner chamber 30. As such, fluid injected by the injector 18 that misses the target outlet 34 hits a wall of the inner chamber 30 and flows by gravity to the outlet 36. The outlet 36 may thus be referred to as a "runoff outlet" in that it is the outlet of the receptacle 16 through which a runoff portion of fluid that missed the target outlet 34 flows out of the receptacle 16. As can be seen in FIG. 3, in this implementation, the inlet 32 and the target outlet 34 are coaxial and the runoff outlet 36 is perpendicular to both the inlet 32 and the target outlet 34. Moreover, the target outlet 34 is sized and positioned relative to the injector 18 to match the intended operation conditions of the injector 18.

Figure 3B:
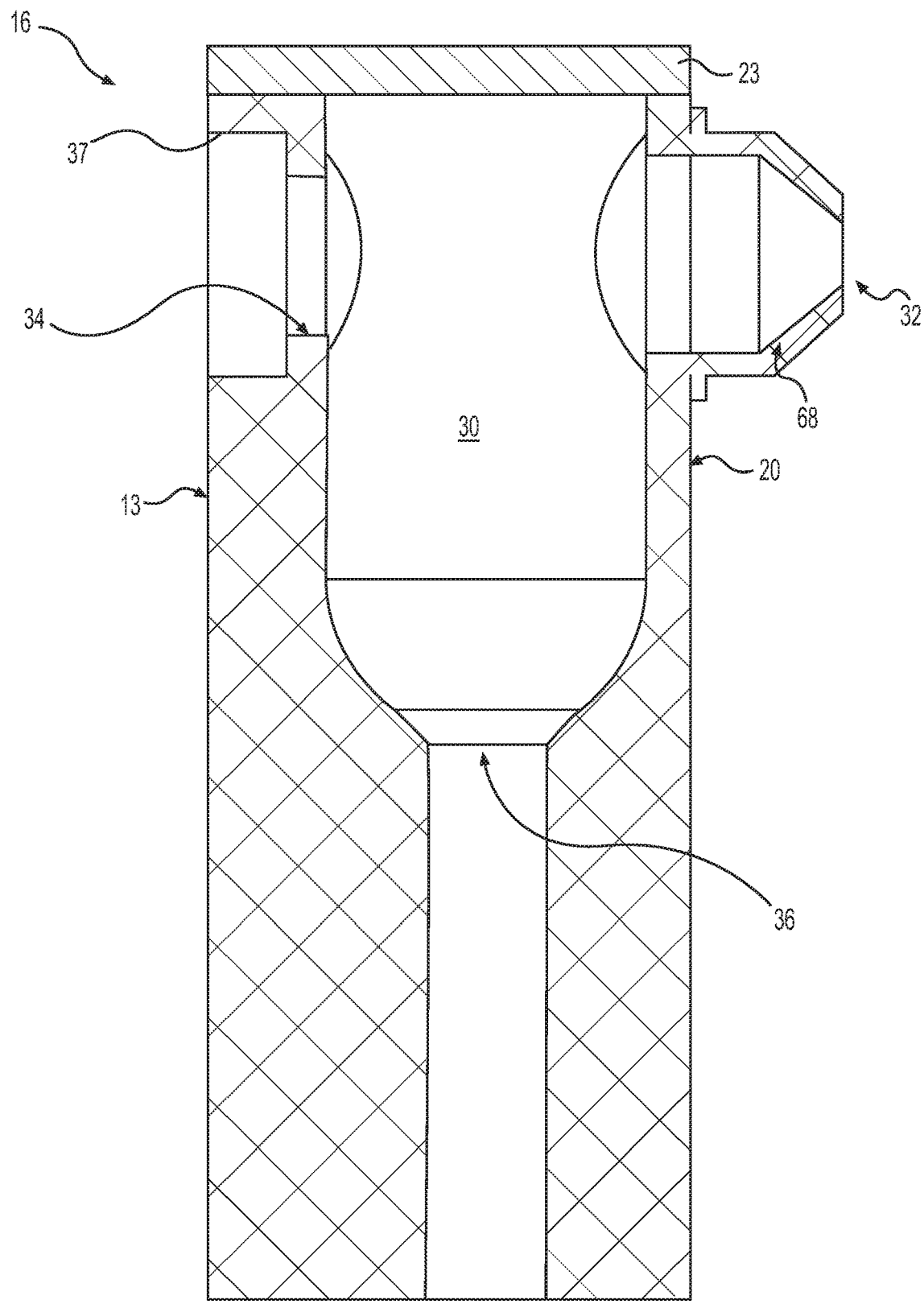
FIG. 3B is a central cross-sectional view of an alternative implementation of the receptacle.

In an alternative implementation, as shown in FIG. 3B, the inlet 32 is defined by a conical projection 68 of the receptacle 16. The conical projection 68 extends outwardly on an outer side 20 of the receptacle 16. A narrow end of the conical projection 68 is located outwardly (i.e., furthest from the target outlet 34) such that, in use, the inlet 32 is closer to the injector 18. As such, the conical projection 68 shortens a distance between the inlet 32 and the injector 18 to facilitate entry of fluid injected by the injector 18 into the inlet 32. In this example, the conical projection 68 is made integrally with a remainder of the receptacle 16. It is contemplated that, in other examples, the conical projection 68 could be made as a separate component that is attached to the receptacle 16.

In this implementation, the target outlet 34 opens up to an outer side 13 of the receptacle 16 while the inlet 32 opens up to the opposite outer side 20 of the receptacle 16. A tube 24 (FIGS. 2 and 6) is connected to the target outlet 34 on one end and to a passage 67 (FIG. 6) of the platform 25 on an opposite end. As shown in FIG. 3, the receptacle 16 has a counterbored pocket 37 for fitting the tube 24. The passage 67 extends from an upper side to a lower side of the platform 25. The tube 24 thus fluidly connects the target outlet 34 to the passage 67 of the platform 25.

Figure 6:
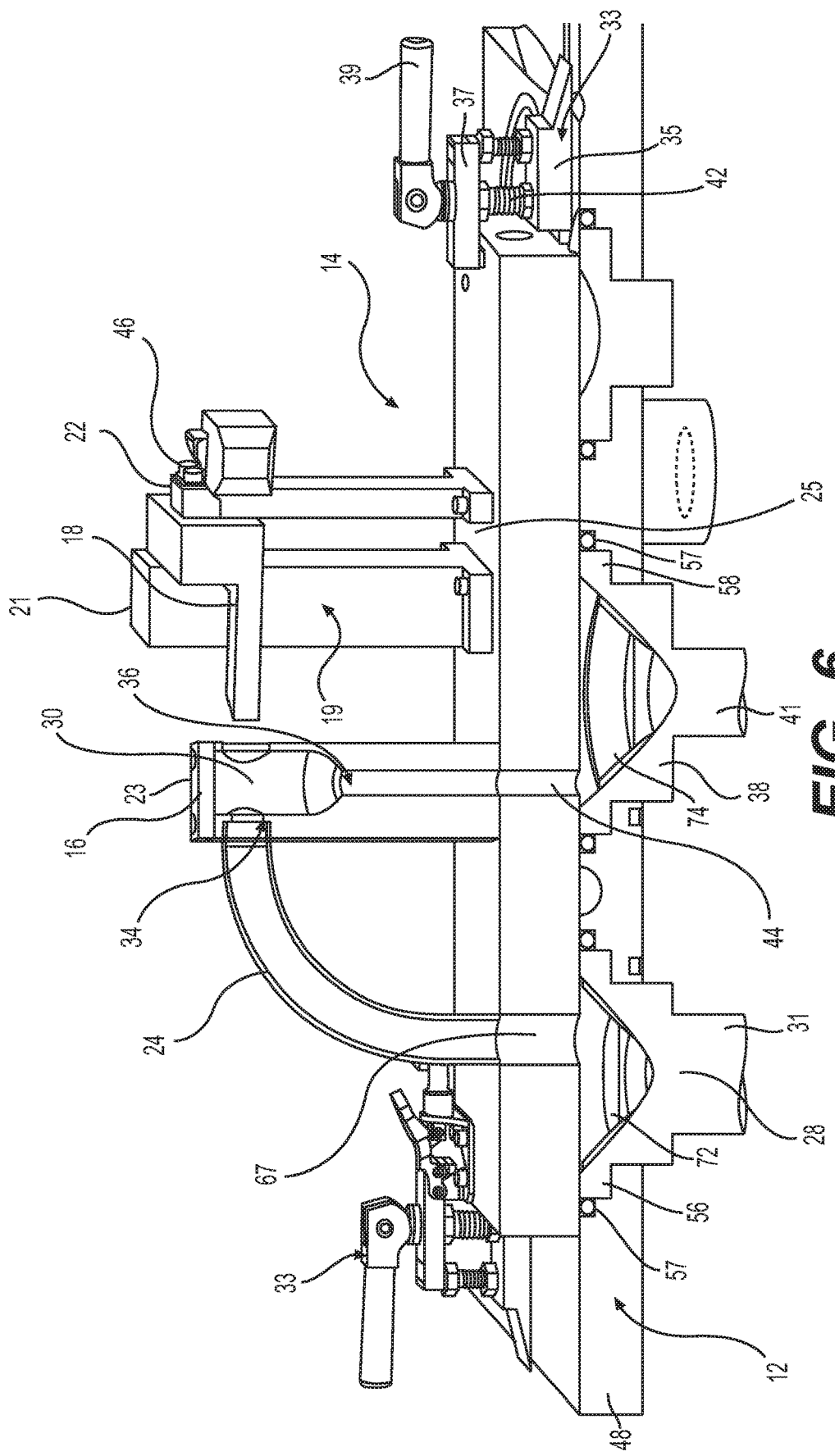
FIG. 6 is a cross-sectional view of a portion of the table and testing rig of FIG. 2.

Moreover, in this implementation, the runoff outlet 36 opens up to an underside of the receptacle 16 (FIG. 6). A passage 44 of the platform 25 is fluidly connected to the runoff outlet 36. The passage 44 extends from the upper side to the lower side of the platform 25.

Figure 4:
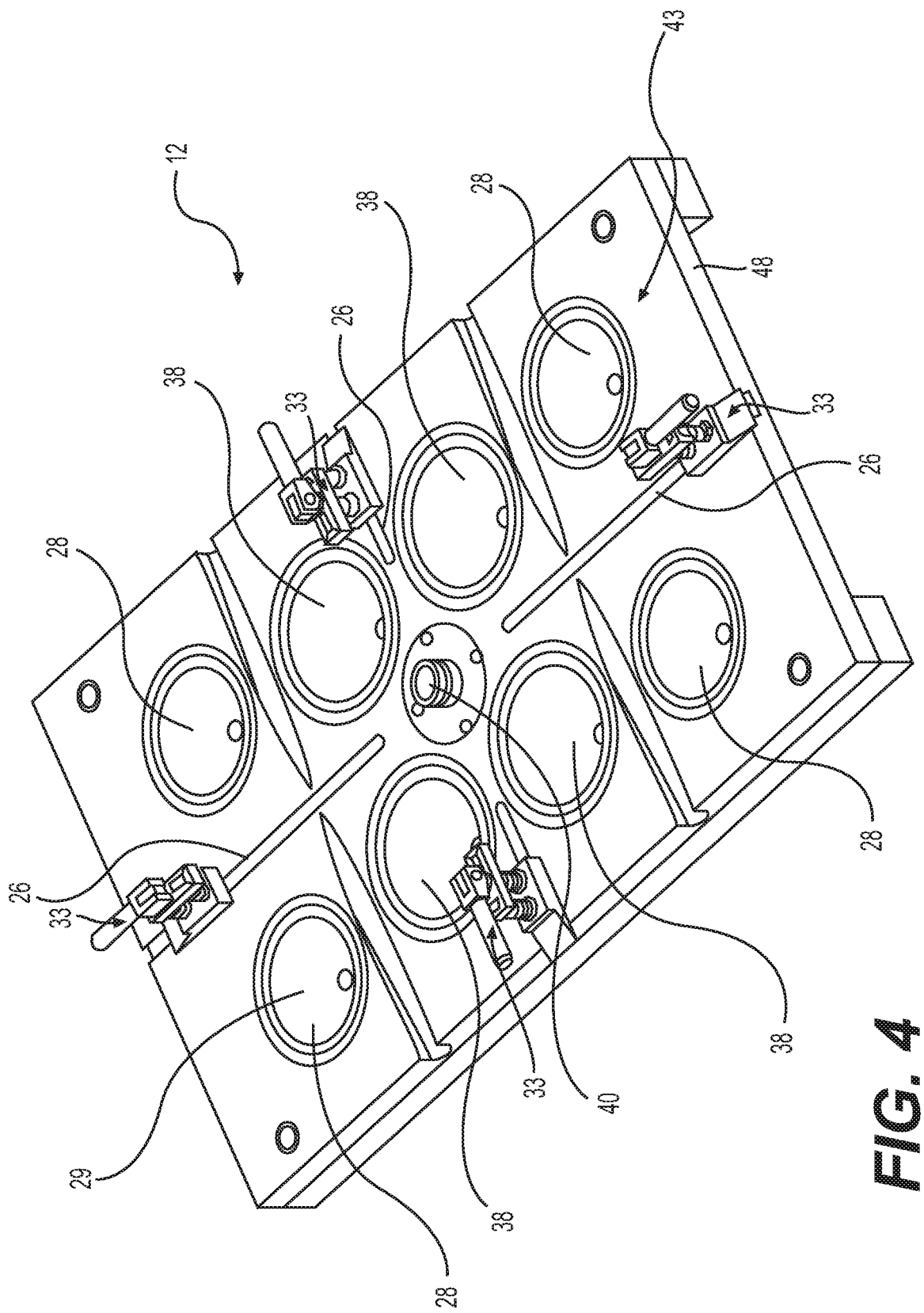
FIG. 4 is a top, left, perspective view of the table of FIG. 2.
Figure 5:
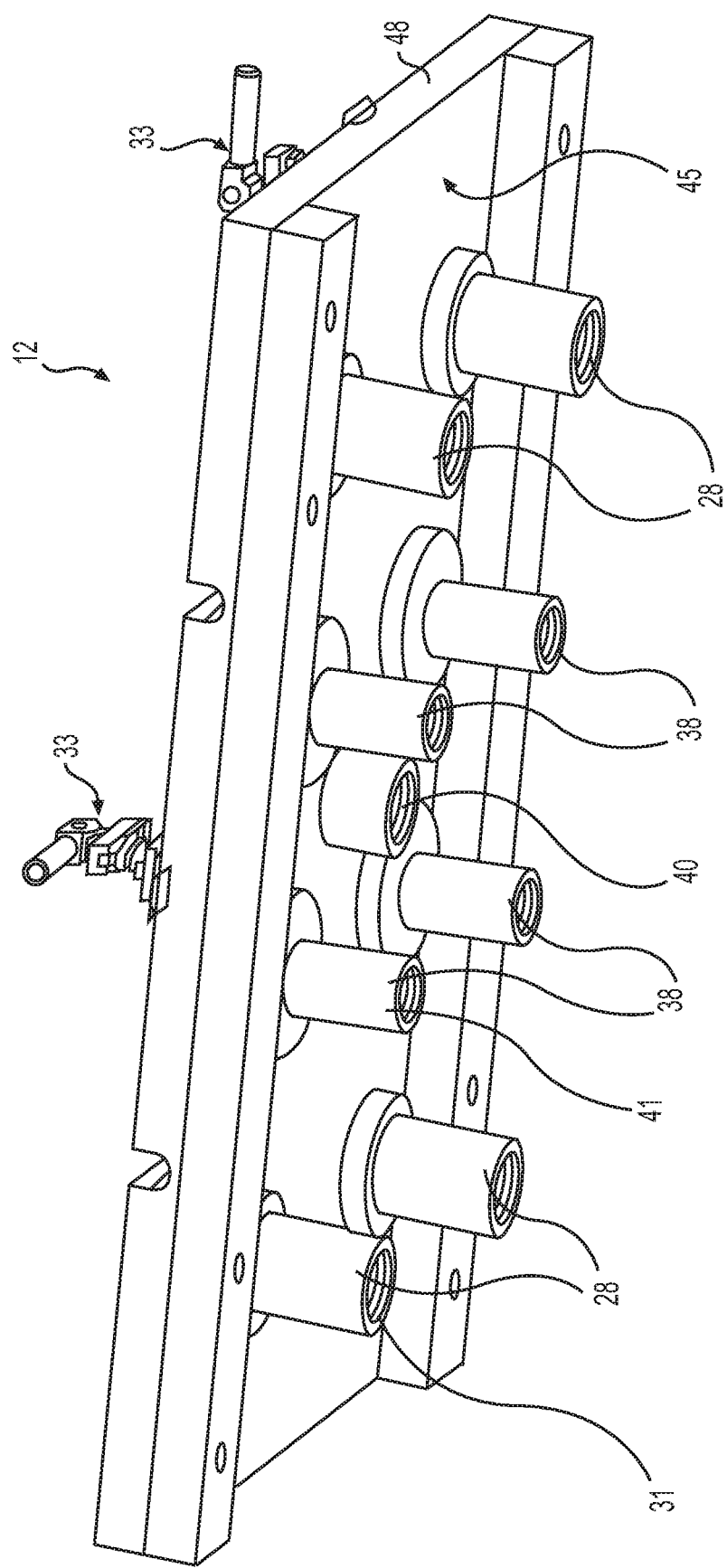
FIG. 5 is a bottom, left, perspective view of the table of FIG. 2.

With reference to FIGS. 4 and 5, the table 12 is configured to receive the flow of fluid from the receptacle 16 and direct it onwards to other components of the testing system 10. To that end, the table 12 comprises a base member 48 and a plurality of fluid collectors 28, 38 mounted thereto, including four primary fluid collectors 28 and four secondary fluid collectors 38. It is contemplated that more or less fluid collectors 28, 38 could be used. The fluid collectors 28, 38 are configured for collecting fluid flowing out of the receptacle 16. As will be explained in more detail below, the testing rig 14 is adjustably mounted to the table 12 such as to align and fluidly communicate the target outlet 34 with one of the primary fluid collectors 28 and to align and fluidly communicate the runoff outlet 36 with one of the secondary fluid collectors 38.

The primary and secondary fluid collectors 28, 38 are substantially similar to one another. As shown in FIG. 6, both the primary and secondary fluid collectors 28, 38 are funnel-shaped and have respective conduits 31, 41 for directing the fluid collected therein towards one or more fluid-quantity measuring devices, as will be described in more detail below. A respective concavity 72, 74 defining the funnel shape of the fluid collectors 28, 38 faces upwards towards the testing rig 14 while the conduits 31, 41 extend downwards below the base member 48. As the primary fluid collectors 28 are expected to receive a greater flow of fluid than the secondary fluid collectors 38 (as they are fluidly connected to the target outlet 34), some dimensions thereof may be greater than those of the secondary fluid collectors 38. For instance, in this implementation, the conduits 31 of the primary fluid collectors 28 have a greater cross-sectional area than the conduits 41 of the secondary fluid collectors 38.

The fluid collectors 28, 38 are disposed in respective openings of the base member 48 that extend from an upper side 43 to a lower side 45 of the base member 48. As shown in FIG. 6, respective annular shoulders 56, 58 of the fluid collectors 28, 38 are received in a corresponding annular pocket of each opening of the base member 48 to retain the fluid collectors 28, 38 onto the base member 48. A sealing member 57 (e.g., an O-ring) is disposed between an outer periphery of each of the fluid collectors 28, 38 and a respective wall of the openings of the base member 48 in order to prevent or otherwise minimize the flow of fluid between the base member 48 and the fluid collectors 28, 38.

The table 12 also comprises an inlet connection 40 for feeding fluid to the platform 25 which is then directed to the injector 18. To that end, the pump 80 is fluidly connected to the injector 18 via the inlet connection 40 (FIG. 4). Notably, a fluid line connects to an underside of the inlet connection 40 (below the base member 48) to fluidly communicate the pump 80 with the inlet connection 40. The platform 25 connects to an upper side of the inlet connection 40 (above the base member 48) via an inlet (not shown) of the platform 25. The inlet of the platform 25 is fluidly connected to the conduit defined by the main support 21 which is in turn fluidly connected to the injector 18 via an inlet thereof. As such, in use, fluid is supplied by the pump 80 through the inlet 40, into the platform 25, then into the conduit of the main support 21 and into the injector 18.

Figure 7:
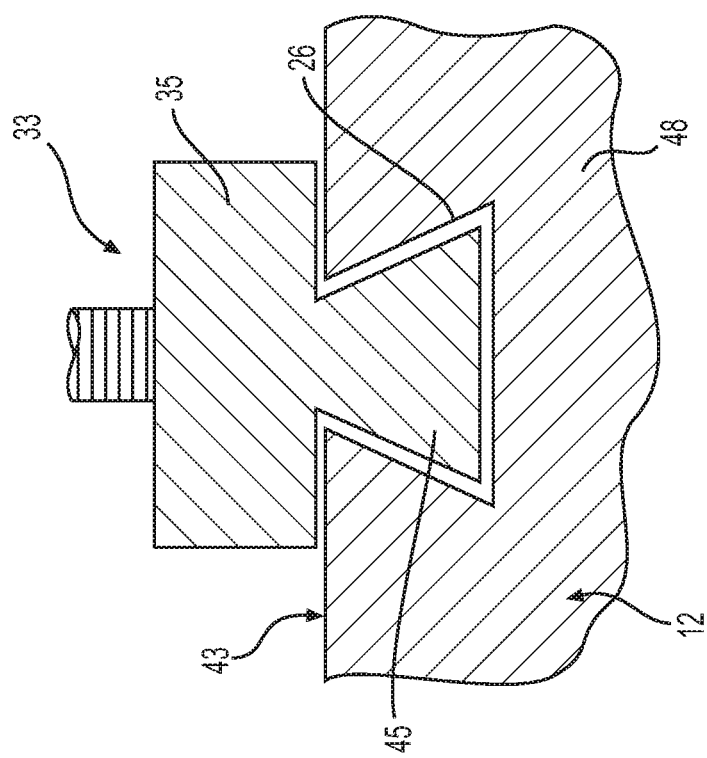
FIG. 7 is a cross-sectional view of a portion of the table and a clamp slidingly engaged therewith.

As mentioned above, the testing rig 14 is adjustably mounted to the table 12. To that end, the base member 48 of the table 12 comprises a plurality of guiding recesses 26 (FIG. 4) provided on the upper side 43 of the base member 48 and configured to engage a plurality of clamps 33 that are clamped to the platform 25. In this implementation, the table 12 includes four guiding recesses 26, two of which extend longitudinally along the base member 48 while the other two 26 extend transversely (in this case perpendicularly) thereto. In other words, the guiding recesses 26 includes two longitudinally-extending guiding recesses 26 and two laterally-extending guiding recesses 26. As shown in FIG. 7, the guiding recesses 26 have a dovetail-shaped cross-sectional section.

Each clamp 33 includes a base 35 and an upper jaw 37 connected thereto via a fastener 42. The base 35 has a projection 45 on an underside of the base 35 for engaging a corresponding one of the guiding recesses 26. Notably, the projection 45 has a matching cross-sectional shape as the guiding recesses 26 (i.e., a dovetail shape in this example) and is sized such as to slidingly engage the guiding recesses 26. The number of clamps 33 provided is equal to the number of guiding recesses 26 (i.e. four in this case) such that each guiding recess 26 is engaged by a corresponding one of the clamps 33.

The clamps 33 are clamped to the platform 25 by compressing the platform 25 between the upper jaw 37 and the base member 48 of the table 12. To that end, each clamp 33 has a handle 39 for rotating the fastener 42 such as to screw the fastener 42 into the base 35 and force the upper jaw 37 closer to the base 35. The handle 39 is rotated in an opposite direction to loosen the grip of the upper jaw 37 on the platform 25.

The injector testing system 10 comprises a plurality of fluid-quantity measuring devices 60, 62 configured for measuring a quantity of fluid having flowed thereto. The plurality of fluid-quantity measuring devices 60, 62 includes primary fluid-quantity measuring devices 60 and secondary fluid-quantity measuring devices 62 which are fluidly connected to corresponding ones of the primary and secondary fluid collectors 28, 38 respectively. Thus, the testing rig 14 is adjustably mounted to the table 12 in order to fluidly communicate one of the primary fluid-quantity measuring devices 60 with the target outlet 34 via the corresponding primary fluid collector 28, and to fluidly communicate one of the secondary fluid-quantity measuring devices 62 with the runoff outlet 36 via the corresponding secondary fluid collector 38. As such, in use, fluid is funneled by the primary fluid collectors 28 from the target outlet 34 to the primary fluid-quantity measuring devices 60 and, similarly, fluid is funneled by the secondary fluid collectors 38 from the runoff outlet 36 to the secondary fluid-quantity measuring devices 62. The fluid-quantity measuring devices 60, 62 are thus configured for measuring a quantity of fluid having flowed thereto from the receptacle 16 via the corresponding fluid collectors 28, 38.

The fluid-quantity measuring devices 60, 62 are positioned below the table 12 (see FIG. 1) such that each fluid-quantity measuring device 60, 62 is fluidly connected to a corresponding one of the conduits 31, 41 of the fluid collectors 28, 38.

When the testing rig 14 is mounted to the table 12, the passage 67 is aligned with one of the primary fluid collectors 28 to be fluidly connected therewith, and the passage 44 is aligned with an adjacent one of the secondary fluid collectors 38 to be fluidly connected therewith. Thus, in use, when the injector 18 injects fluid into the receptacle 16, fluid flows from the target outlet 34 into the tube 24, into the passage 67, into the aligned primary fluid collector 28 and into a corresponding one of the primary fluid-quantity measuring devices 60 that is fluidly connected to that primary fluid collector 28. Similarly, fluid flows from the runoff outlet 36 into the passage 44, then into the aligned secondary fluid collector 38 and into a corresponding one of the fluid-quantity measuring devices 62 that is fluidly connected to that secondary fluid collector 38. The two fluid-quantity measuring devices 60, 62 and the two corresponding fluid collectors 28, 38 which, during testing, are fluidly connected to the target outlet 34 and the runoff outlet 36 of the receptacle 16 will be referred to as "active" for clarity. The active fluid-quantity measuring device 60 is thus operable to measure a quantity of fluid having flowed thereto via the target outlet 34 while the active fluid-quantity measuring device 62 is operable to measure a quantity of fluid having flowed thereto via the runoff outlet 36. In this implementation, the fluid-quantity measuring devices 60, 62 are thus used in pairs, one of the primary fluid-quantity measuring devices 60 being used for receiving fluid from the target outlet 34 and an adjacent one of the secondary fluid-quantity measuring devices 62 being used for receiving fluid from the runoff outlet 36. Each such pair of adjacent ones of the primary and secondary measuring devices 60, 62 can thus be referred to as a fluid quantifying unit 63 (FIG. 8)

In this implementation, the fluid-quantity measuring devices 60, 62 are scales 60, 62 configured to measure a weight of fluid collected therein. Moreover, in this implementation, the primary scales 60 have a greater volume capacity than the secondary scales 62 since the primary scales 60 are expected to contain a greater quantity of fluid than the secondary scales 62. In alternative implementations, the primary and secondary scales 60, 62 may be identical to one another. Furthermore, it is contemplated that fluid quantity measuring devices 60, 62 may be any other suitable type of fluid-quantity measuring device in alternative implementations (e.g., flow meters).

The functionality of the injector testing system 10 is controlled by a testing controller 55 which controls various components of the testing system 10. Notably, as shown in FIG. 8, the testing controller 55 is in communication with, amongst others, the scales 60, 62 of each fluid quantifying unit 63, the pump 80 and the compressor 90. As will be described below, the testing controller 55 is also in communication with a number of valves for controlling flow of fluid through the components of the testing system 10 and a number of sensors for sensing parameters related to fluid that is to be pumped to the injector 18.

Figure 9:
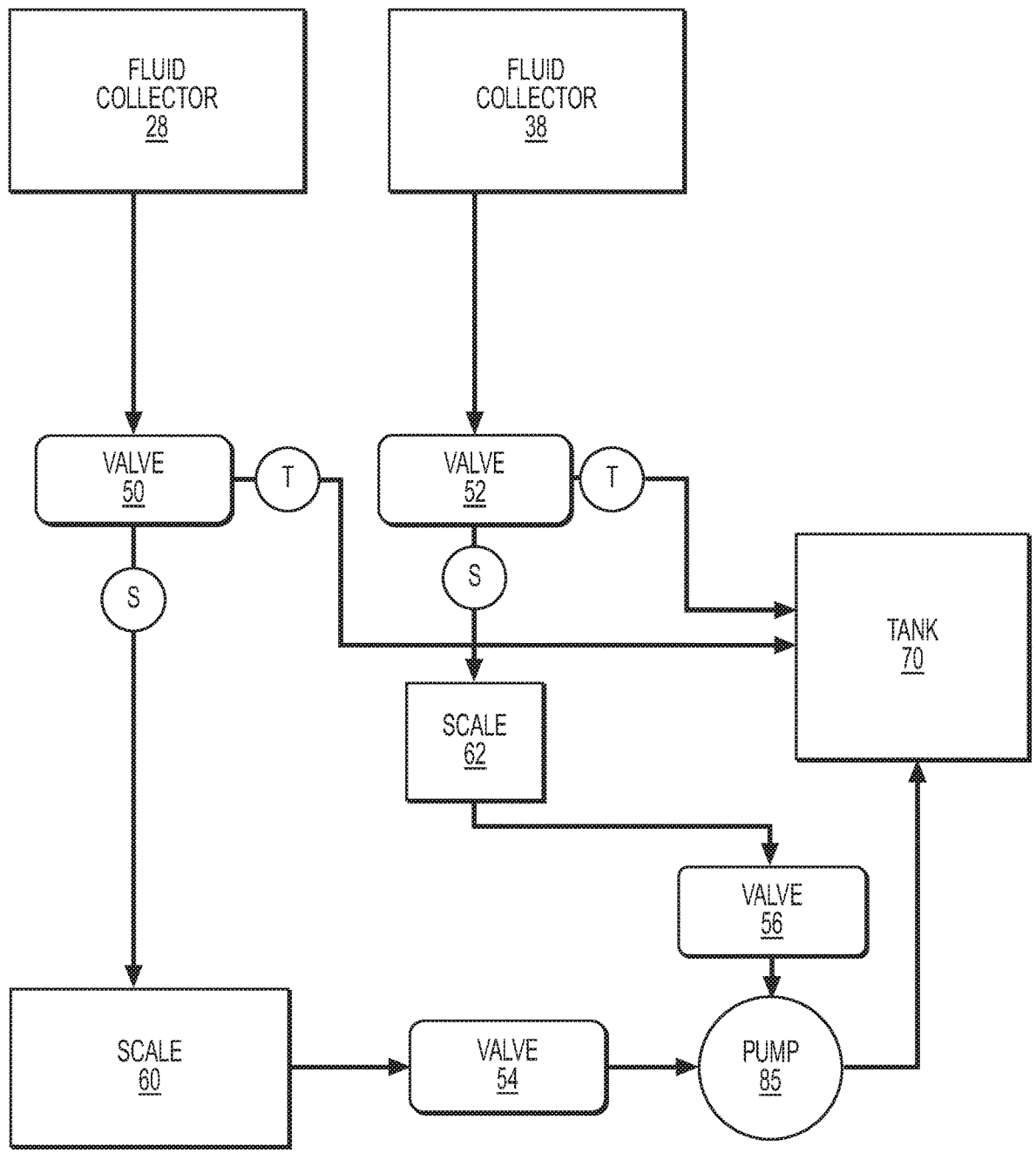
FIG. 9 is a schematic view of a fluid-quantity measuring coupling of the injector testing system of FIG. 8.

Notably, the injector testing system 10 includes a plurality of valves for controlling the flow to and from the scales 60, 62 of each fluid quantifying unit 63. For example, FIG. 9 shows the configuration of a given one of the fluid quantifying units 63. The fluid quantifying unit 63 includes valves 50, 52 fluidly connected between the primary scale 60 and a corresponding one of the primary fluid collectors 28, and between the secondary scale 62 and a corresponding one of the secondary fluid collectors 38. The valve 50 is controlled by the testing controller 55 to selectively direct flow of fluid from the primary fluid collector 28 toward the tank 70 (in a position T of the valve 50) or the primary scale 60 (in a position S of the valve 50). Similarly, the valve 52 is controlled by the testing controller 55 to selectively direct flow of fluid from the secondary fluid collector 38 toward the tank 70 (in the position T of the valve 52) or the secondary scale 62 (in the position S of the valve 52). In addition, the fluid quantifying unit 63 includes valves 54, 56 respectively fluidly connected between the primary scale 60 and a pump 85, and between the secondary scale 62 and the pump 85. The pump 85 is fluidly connected to the tank 70 and is configured to pump fluid from the scales 60, 62 to the tank 70. The valve 54 is controlled by the testing controller 55 to selectively block flow of fluid out of the primary scale 60 to the pump 85. Similarly, the valve 56 is controlled by the testing controller 55 to selectively block flow of fluid out of the secondary scale 62 to the pump 85.

It should be understood that each of the fluid quantifying units 63 is configured in the same manner as that described above with respect to FIG. 9.

The testing controller 55 is also in communication with a valve 93 (FIG. 8) for selectively fluidly connecting the injector 18 with one of the pump 80 (to supply fluid to the injector 18) and the compressor 90 (to supply compressed air to the injector 18). Another valve 82, in communication with the testing controller 55, selectively blocks fluid flow from the pump 80 to the injector 18. Another valve 86, in communication with the testing controller 55, fluidly connects the pump 80 with the fluid quantifying units 63 (via a fluid line 83), bypassing the testing rig 14. The testing controller 55 can control the valve 86 to fluidly connect the pump 80 to the scales 60, 62, through the fluid line 83, during a warm-up process in which fluid contained in the testing system 10 is being heated to a target temperature. Thus, during such a warm-up process, prior to initiating a test of the injector 18, fluid bypasses the testing rig 14 and rather gets circulated to the scales 60, 62 and returned to the pump 80.

A drain 95 (FIG. 8) is provided to selectively fluidly connect the testing rig 14 with the tank 70. The drain 95 may be controlled by the testing controller 55 and/or manually by the user.

As mentioned above, the injector testing system 10 comprises sensors for sensing parameters related to fluid circulating in the testing system 10. More particularly, as shown in FIG. 8, the testing system 10 comprises a pressure sensor PS, a temperature TS and a flow rate sensor QS respectively configured to sense a pressure, a temperature and a flow rate of fluid to be supplied to the injector 18. These parameters may be useful to track as they can affect the behavior of fluid supplied to the injector 18. In this implementation, the sensors PS, TS, QS are operatively connected between the pump 80 and the injector 18.

The testing controller 55 has a processor 115 for carrying out executable code, and a non-transitory memory module 117 that stores the executable code in a non-transitory medium (not shown) included in the memory module 117. The processor 115 includes one or more processors for performing processing operations that implement functionality of the testing controller 55. The processor 115 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory module 117 may be a semiconductor memory (e.g., read-only memory (ROM) and/or random-access memory (RAM)), a magnetic storage medium, an optical storage medium, and/or any other suitable type of memory. While the testing controller 55 is represented as being one entity in this implementation, it is understood that the testing controller 55 could comprise separate entities for controlling components separately.

The testing controller 55 implements a testing process in order to test the injector 18. The user first installs the injector 18 to be tested onto the testing rig 14 such as to position the injector 18 to inject fluid towards the inlet 32 and the target outlet 34 of the receptacle 16 as described above. The user then initiates the testing process implemented by the testing controller 55. For example, the user may push a button used to initiate the testing process.

The testing process begins by locking the cover 15 in its closed position (i.e., when the cover 15 encloses the testing rig 14). To that end, a lock (not shown) controlled by the testing controller 55 is provided which secures the cover 15 in its locked position. A magnetic sensor (not shown) is installed on the bench 11 to interact with a magnet (not shown) on the cover 15 which is positioned to interact with the magnetic sensor when the cover 15 is in its closed position. The magnetic sensor sends a signal to the testing controller 55 when the magnet is detected, indicating that the cover 15 is in the closed position and can therefore be locked.

The testing process then ensures that the scales 60, 62 are clear of fluid. To that end, the valves 50, 52 are switched to their position T such as to fluidly communicate the tank 70 with the fluid collectors 28, 38. Next, the valves 54, 56 are opened to fluidly communicate the scales 60, 62 with the pump 85. The pump 85 is then activated to purge fluid from the scales 60, 62 into the tank 70. More specifically, the scales 60, 62 are purged until fluid contained in each of the scales 60, 62 weighs less than a weight threshold particular to each scale 60, 62. In the present implementation, the weight threshold of each scale is equal to 5% of the weight previously measured by that particular scale 60, 62. It is contemplated that the weight threshold of each scale 60, 62 may be more or less than 5% of the weight previously measured by that particular scale 60, 62 in other implementations. The valves 56 are then closed to block communication between the secondary scales 62 and the pump 85. The pump 85 is then turned off, and the valves 54 are closed to block communication between the primary scales 60 and the pump 85. This part of the testing process ensures that the scales 60, 62 are acceptably clear of fluid.

Next, the testing controller 55 resets the scales 60, 62. That is, the testing controller 55 zeroes the scales 60, 62 such that, even if the scales 60, 62 contain a small amount of fluid, the scales 60, 62 measure 0 as the weight of fluid contained therein, if any.

The testing controller 55 then causes the injector 18 to inject fluid into the receptacle 16 via the inlet 32. To that end, the testing controller 55 controls the valves 82, 93 to fluidly communicate the pump 80 with the injector 18. The pump 80 then pumps fluid from the tank 70 to the injector 18 which consequently injects fluid into the inner chamber 30 of the receptacle 16 via the inlet 32.

In parallel, the testing controller 55 switches the valves 50, 52 to their position S such as to fluidly communicate the scales 60, 62 with the active fluid collectors 28, 38, allowing fluid from the target outlet 34 and the runoff outlet 36 to flow to the active scales 60, 62. A timer is simultaneously started by the testing controller 55. The valves 50, 52 are switched to their position T once the timer reaches a predetermined amount of time (e.g., 60 seconds) deemed to be sufficient for a majority of fluid to have flowed to the active scales 60, 62 from the target and runoff outlets 34, 36. The active scales 60, 62 continuously measure the weight of the fluid contained therein. Once the weights measured by the active scales 60, 62 have stabilized, the active primary scale 60 sends a signal to the testing controller 55 representative of a primary weight W1 of fluid having flowed to the active primary scale 60 via the target outlet 34, and the active secondary scale 62 sends a signal to the testing controller 55 representative of a secondary weight W2 of fluid having flowed to the active secondary scale 62 via the runoff outlet 36.

Based on the weights W1, W2, the testing controller 55 can then determine a proportion of fluid PT that has been injected into the target outlet 34 of the receptacle 16. In this implementation, the testing controller 55 divides the primary weight W1 by a sum of the primary weight W1 and the secondary weight W2 to obtain the proportion of fluid PT (i.e. $PT=W1/(W1+W2)$). As will be described further below, the proportion of fluid PT may then be communicated to the user via a user interface of the injector testing system 10. Furthermore, in this implementation, the testing controller 55 also compares the proportion of fluid PT with a predetermined minimum allowable proportion and determines if the proportion of fluid PT is allowable. That is, if the proportion of fluid PT is greater than or equal to the predetermined minimum allowable proportion, the testing controller 55 determines that the proportion of fluid PT is allowable and therefore that the injector 18 performed adequately. In this example, the predetermined minimum allowable proportion is 95% (i.e., $W1/(W1+W2) \geq 0.95$).

It is understood that, in alternative implementations in which the scales 60, 62 are other types of fluid-quantity measuring devices, the signals received by the controller 55 from the fluid-quantity measuring devices 60, 62 are representative of a first quantity of fluid having flowed to the fluid-quantity measuring device 60 via the target outlet 34 and a second quantity of fluid having flowed to the fluid-quantity measuring device 62 via the runoff outlet 36. The proportion of fluid PT can be similarly determined by dividing the first quantity of fluid by the sum of the first quantity of fluid and the second quantity of fluid.

In order to clear the scales 60, 62 of fluid, next, the valves 54, 56 are opened and the pump 85 is activated to purge fluid from the scales 60, 62 and pump it into the tank 70. The testing controller 55 controls the pump to stop purging the scales 60, 62 until fluid contained in each of the scales 60, 62 weighs less than the weight threshold particular to each scale 60, 62 that is equal to or less than 5% of the weight previously measured by that particular scale 60, 62 (i.e., 5% of the weights W1, W2). In alternative implementations, the weight threshold may be more than 5%. The valves 54, 56 are then closed to block flow of fluid out of the scales 60, 62.

A purge cycle is then implemented by the testing controller 55 to purge the injector 18 from fluid accumulated therein. First, the valve 82 is closed to block the flow of fluid from the pump 80 to the injector 18. Circulation of fluid between the tank 70 and the pump 80 is maintained. The valve 93 is then switched such as to fluidly communicate the compressor 90 with the injector 18, causing compressed air to flow into the injector 18, thus clearing the injector 18 of fluid. The valve 93 is maintained in this position for a predetermined amount of time that varies in accordance with the injector 18 being tested. The fluid mist collector 65 is then activated for a set amount of time (e.g., 5 seconds) to clear fluid mist enclosed within the cover 15. The cover 15 is then unlocked to allow opening thereof and subsequent removal of the injector 18.

Figure 10:
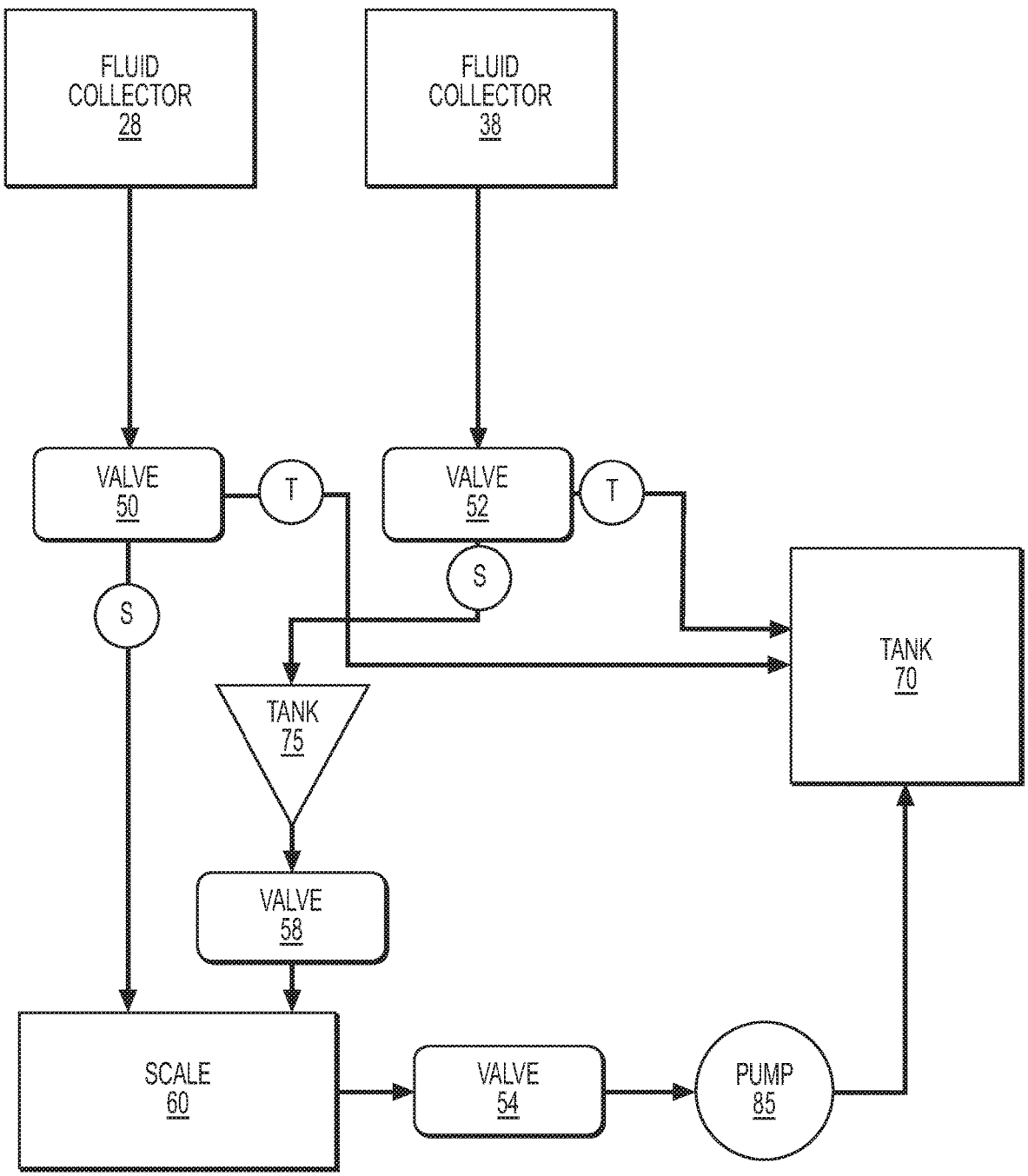
FIG. 10 is a schematic view of an alternative implementation of the injector testing system of FIG. 8.

As shown in FIG. 10, in an alternative implementation, the injector testing system 10 could having a single active scale 60 instead of two (or other fluid-quantity measuring device). That is, fluid from the target outlet 34 is funneled to the active scale 60 and fluid from the runoff outlet 36 is funneled to the same active scale 60. In this alternative implementation, the configuration of the fluid collectors 28, 38 is identical to that described above, with the active primary fluid collector 28 fluidly connected to the target outlet 34 and the active secondary collector 38 fluidly connected to the runoff outlet 36. However, the testing system 10 includes tanks 75 fluidly connected between respective ones of the scales 60 and corresponding secondary fluid collectors 38. The tanks 75 have a smaller volume than the tanks 70. Valves 58, in communication with the testing controller 55, selectively fluidly connect the scales 60 and the tanks 75. The valves 58 are configured to selectively block flow of fluid out of the tanks 75.

The testing process implemented by the testing controller 55 for the implementation of FIG. 10 will now be described. As with the previously described implementation, the testing process begins with ensuring that the active scale 60 is clear of fluid. To that end, the valves 50, 52 are switched to their position T such as to fluidly communicate the tank 70 with the fluid collectors 28, 38. The valves 58 are opened for a given amount of time to allow any fluid contained in the tanks 75 to flow to the scales 60. Next, the valves 54 are opened to fluidly communicate the scales 60 with the pump 85. The pump 85 is then activated to purge fluid from the scales 60 into the tank 70. The scales 60 are purged until fluid contained in each of the scales 60 weighs less than a weight threshold particular to each scale 60. In the present implementation, the weight threshold of each scale 60 is equal to 5% of the weight previously measured by that particular scale 60. The weight threshold of each scale 60 may be more or less than 5% of the weight previously measured by that particular scale 60 in other implementations. The valves 54 are then closed to block communication between the scales 60 and the pump 85. The valves 58 are closed to block communication between the tanks 75 and the scales 60. The pump 85 is then turned off.

Next, the testing controller 55 resets the scales 60. That is, the testing controller 55 zeroes the scales 60 such that, even if the scales 60 contain a small amount of fluid, the scales 60 measure 0 as the weight of fluid contained therein, if any.

The testing controller 55 then causes the injector 18 to inject fluid into the receptacle 16 via the inlet 32. To that end, the testing controller 55 controls the valves 82, 93 to fluidly communicate the pump 80 with the injector 18. The pump 80 then pumps fluid from the tank 70 to the injector 18 which consequently injects fluid into the inner chamber 30 of the receptacle 16 via the inlet 32.

The testing controller 55 then switches the valves 50 to their position S such as to fluidly communicate the scales 60 with the primary fluid collectors 28, allowing fluid from the target outlet 34 to flow to the active scale 60. At the same time, the testing controller 55 switches the valves 52 to their position S such as to fluidly communicate the tanks 75 with the secondary fluid collectors 38, allowing fluid from the runoff outlet 36 to flow to a given one of the tanks 75 (i.e., the "active" tank 75). A timer is simultaneously started by the testing controller 55. The valves 50, 52 are then switched to their position T once the timer reaches a predetermined amount of time (e.g., 60 seconds) deemed to be sufficient for a majority or an entirety of fluid to have flowed to the active scale 60 and the active tank 75 from the target and runoff outlets 34, 36 respectively. Once the weight measured by the active scale 60 has stabilized, the active scale 60 sends a signal to the testing controller 55 representative of the primary weight W1 of fluid having flowed to the active primary scale 60 via the target outlet 34.

Next, the valves 58 are opened such that fluid contained in the active tank 75 flows to the active scale 60, adding itself to fluid that had flowed to the active scale 60 via the target outlet 34. A timer is simultaneously started by the testing controller 55. The valves 58 are closed once the timer reaches a predetermined amount of time (e.g., 60 seconds) deemed to be sufficient for a majority or an entirety of fluid to have flowed to the active scale 60 from the active tank 75. The valves 58 are then closed. Once the weight measured by the active scale 60 has stabilized, the active scale 60 sends a signal to the testing controller 55 representative of a weight of fluid having flowed to the active scale 60 via both the target outlet 34 and the runoff outlet 36 (i.e., a sum of fluid having flowed to the active scale 60 via the target outlet 34 and fluid having flowed to the active scale 60 via the runoff outlet 36). The proportion of fluid PT that has been injected into the target outlet 34 of the receptacle 16 can be determined in a manner similar to that described above with reference to FIG. 9.

Alternatively, rather than mixing fluid from the target outlet 34 and the runoff outlet 36 in the active scale 60 to measure the total weight, the active scale 60 can be purged of fluid after measuring the primary weight W1. For instance, in such an example, after measuring the primary weight W1, the valves 54 are opened and the pump 85 is activated to pump fluid from the active scale 60 into the tank 70. Once fluid contained in each of the scales 60 weighs less than the weight threshold particular to each scale 60, the pump 85 is turned off. The valves 54 are then closed.

Subsequently, the valves 58 are opened such that fluid contained in the active tank 75 flows to the active scale 60. A timer is simultaneously started by the testing controller 55. The valves 58 are closed once the timer reaches a predetermined amount of time (e.g., 60 seconds) deemed to be sufficient for a majority or an entirety of fluid to have flowed to the active scale 60 from the active tank 75. The valves 58 are then closed. Once the weight measured by the active scale 60 has stabilized, the active scale 60 sends a signal to the testing controller 55 representative of the secondary weight W2 of fluid having flowed to the active scale 60 via the runoff outlet 36. The proportion of fluid PT that has been injected into the target outlet 34 of the receptacle 16 can be determined in a manner similar to that described above with reference to FIG. 9.

The purge cycle described above is then implemented by the testing controller 55 to purge the injector 18 from fluid accumulated therein.

In an alternative implementation, multiple injectors 18 can be tested simultaneously. For example, two, three or more testing rigs 12 can be mounted to the table 12 and fluidly connected to a respective one of the fluid quantifying units 63. As such, a corresponding proportion of fluid PT for each simultaneously-tested injector 18 can be determined during a single testing process. In such an implementation, each platform 25 can be simultaneously fluidly connected to the inlet 40 of the table 12 to provide fluid to the respective injector 18 mounted to each testing rig 14. For example, an adapter may be provided on the inlet 40 for splitting the flow of fluid to as many testing rigs 14 as desired. Alternatively, the table 12 may include multiple inlets 40, one for each testing rig 14.

Figure 11:
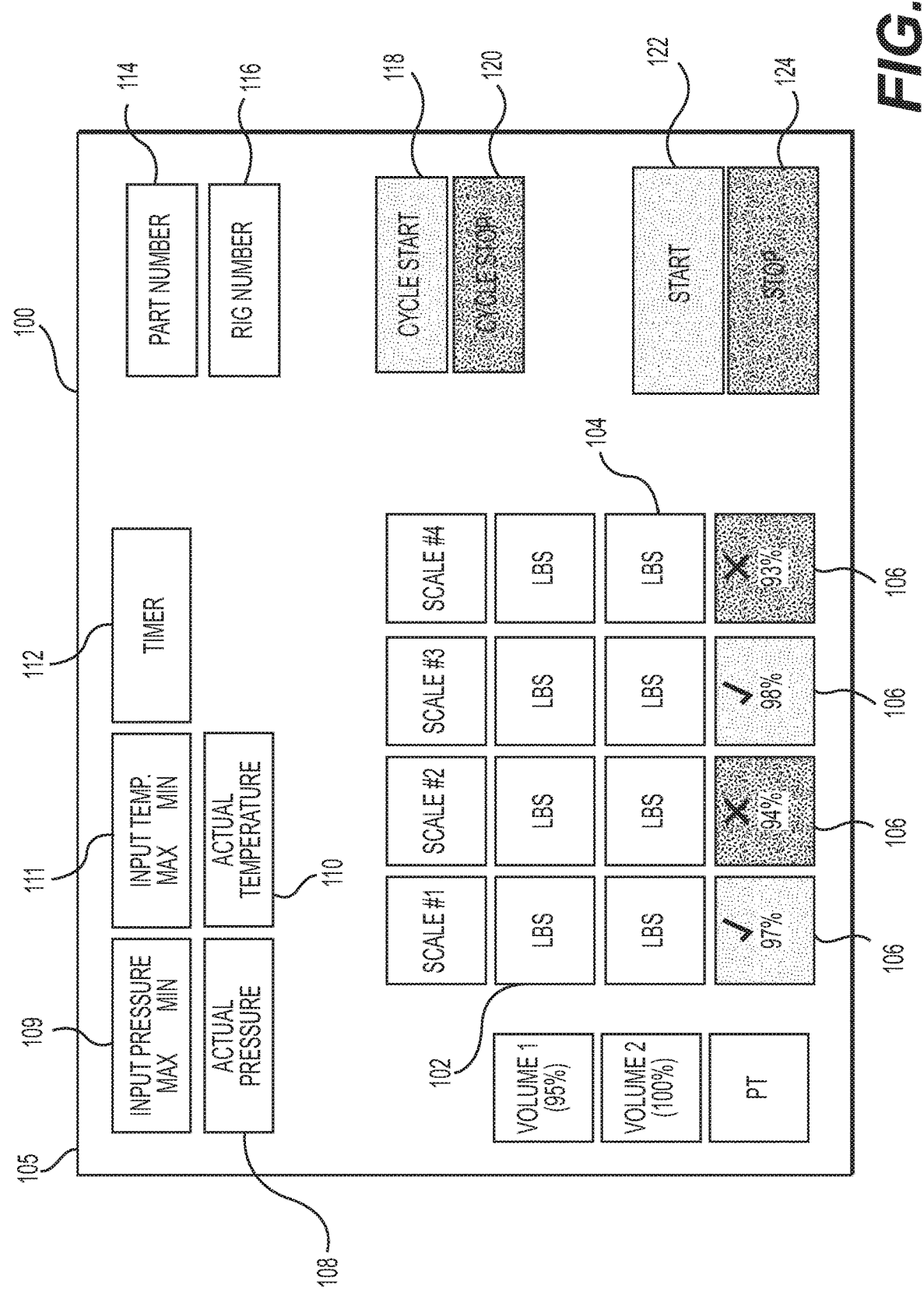
FIG. 11 shows an exemplary user interface of the injector testing system.

With reference to FIG. 11, the injector testing system 10 comprises a user interface 100 in communication with the testing controller 55. In this implementation, the user interface 100 is provided as part of the bench 11 such that the user at the bench 11 has access to the user interface 100. The user interface 100 is configured to permit control of the injector testing system 10 by the user and to communicate to the user information pertaining to the operation of the injector testing system 10. For instance, in this implementation, the user interface 100 displays a weight (or other quantity) 102 measured by the primary scale 60 of each of the fluid quantifying units 63 (i.e., the primary weight W1), and a total weight (or other quantity) 104 which is a sum of the weights measured by the primary and secondary scales 60, 62 of each of the fluid-quantifying units 63 (i.e., W1+W2). The user interface 100 also displays, at 106, the proportion of fluid PT corresponding to each of the fluid-quantifying units 63. In this implementation, a single injector 18 is tested at a time and therefore the user interface 100 only displays the proportion of fluid PT for one of the fluid-quantifying units 63. In some implementations, the user interface 100 could display a weight (or other quantity) measured by the secondary scale 62 of each of the fluid quantifying units 63 (i.e., the secondary weight W2). As such, the user interface 100 can display one or more of the primary weight W1, the secondary weight W2, the total weight W1+W2, and the proportion of fluid PT.

In this implementation, the user interface 100 is configured to indicate to the user if the proportion of fluid PT for each of fluid quantifying units 63 has been determined to be allowable. For instance, in this example, a checkmark is displayed next to the proportion of fluid PT if it is determined to be allowable and an X mark is displayed next to the proportion of fluid PT if it is determined not to be allowable. Any other visual representation may be used to indicate the allowability of the proportion of fluid PT in other implementations. For instance, the proportion of fluid PT may be indicated in green when the proportion of fluid PT is allowable and red if it is not allowable.

In addition, in this implementation, the user interface 100 displays, at 108, the pressure measured by the pressure sensor PS and, at 110, the temperature measured by the temperature sensor TS. The user interface 100 also displays an input pressure 109 and an input temperature 111 to which fluid supplied to the injector 18 is set. A timer 112 is also displayed by the user interface 100 for example to time the different steps of the testing process. Moreover, the user interface 100 displays a part number 114 corresponding to the injector 18 being tested and a rig number 116 corresponding to the type of testing rig 14 mounted on the table 14. The part number 114 and rig number 116 are entered by the user via an input device (e.g., a keyboard) connected to the testing controller 55 before testing the injector 18.

In this implementation, the user interface 100 comprises a graphic display unit 105 such as a screen for displaying the information pertaining to the operation of the injection testing system 10. It is contemplated that, in other implementations, the information may be displayed on any other suitable type of graphic display unit (e.g., dials).

The graphic display unit 105 is a touch-screen display such that the user can affect commands by touching the graphic display unit 105. For example, the touch-screen display 105 includes a start button 122 and a stop button 124 to start and stop operation of the different components of the injector testing system 10. The touch-screen display also includes a cycle start button 118 to start the testing process implemented by the testing controller 55, and a cycle stop button 120 to stop the testing process and start the purge cycle described above.

It is contemplated that, in alternative implementations, the user interface 100 may be part of a standalone device that is physically separate from the bench 11. For instance, in some implementations, the user interface 100 may be part of a device that is wirelessly connected to the testing controller 55 such as to exchange information with the testing controller 55. For example, the user interface 100 may be part of a cell phone (e.g., a smart phone), a tablet, a personal computer (e.g., a laptop, a desktop computer), a personal digital assistant or any other such device. The wireless link between the device and the testing controller 55 may be established via Internet, Bluetooth®, or any other suitable wireless protocol.

In an alternative implementation, the user interface 100 comprises a control panel mounted to the bench 11 for displaying the data described above and providing controls for the user to control operation of the testing controller 55. The control panel includes dials, gauges or any other physical components for communicating the data described above (e.g., the weight W1, the weight W2, the proportion of fluid PT, the total weight W1+W2, etc.) to the user. Moreover, a light signal may indicate to the user if the determined proportion of fluid PT for each fluid quantifying unit 63 is allowable or not (e.g., a green light if allowable, a red light if not allowable). Furthermore, the control panel includes physical switches or buttons that are turned ON or OFF by the user to control operation of the testing controller 55.

Figure 12:
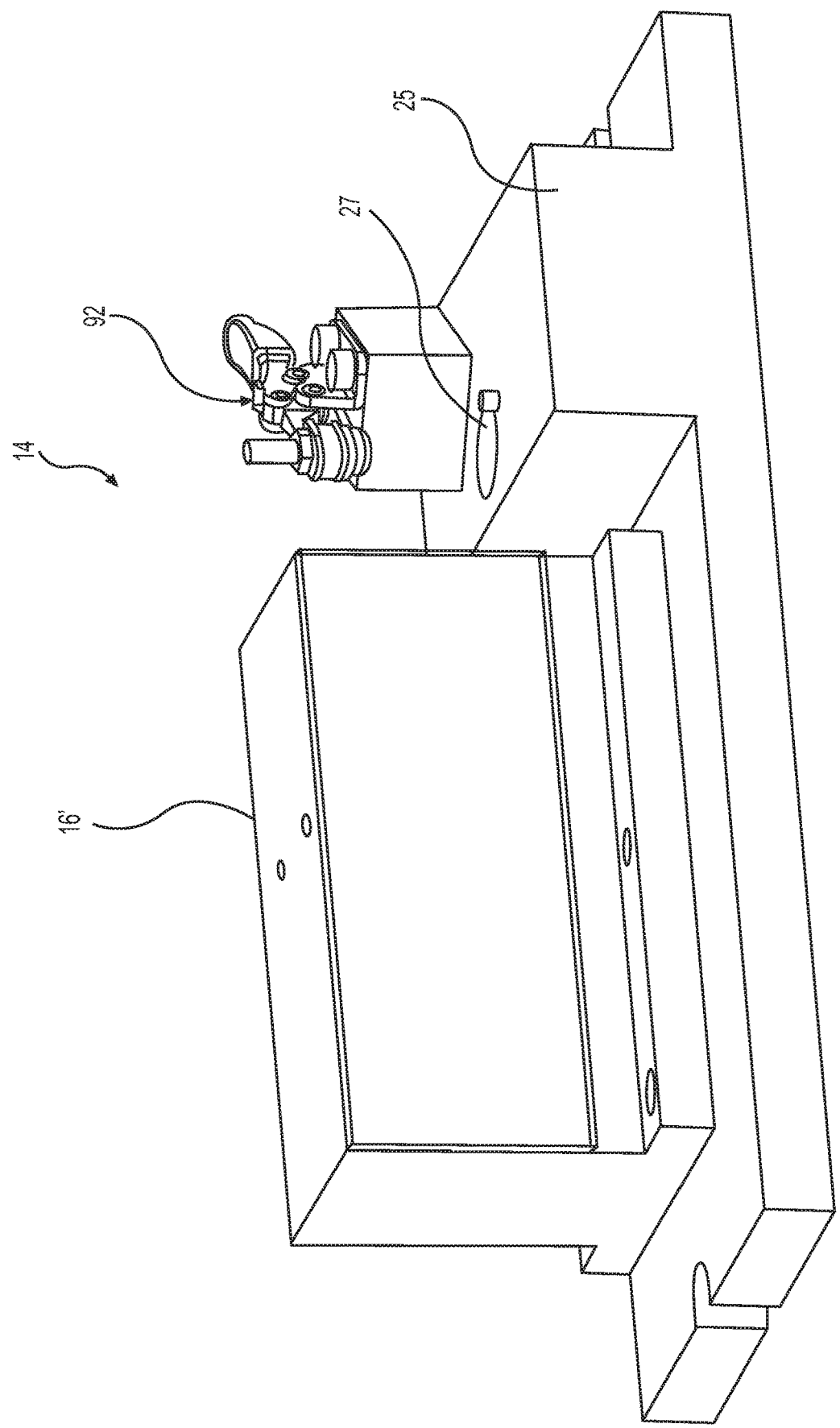
FIG. 12 is a top, right side perspective view of an alternative implementation of the testing rig.

FIGS. 12 and 13 show the testing rig 14 in accordance with an alternative implementation. In this alternative implementation, the platform 25 functions as the injector mounting structure and has an inlet 27 for supplying fluid to the injector 18 to be tested. That is, the testing rig 14 does not have the injector mounting structure 19 previously described. Rather, the injector 18 is mounted directly to the platform 25 via a securing member 92 which is fastened to the platform 25 and to the injector 18. Moreover, a receptacle 16' of the testing rig 14 defines a conduit 47 connected to the inner chamber 30 via the target outlet 34. The conduit 47 is connected to an outlet 39 that is in turn connected to a conduit (not shown) of the platform 25. As such, in this alternative implementation, the testing rig 14 does not include the tube 24 connecting the receptacle to the platform. Rather, the platform 25 is directly connected to the receptacle 16'.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An injector testing system, comprising:
a testing rig, comprising:
a receptacle defining an inner chamber, the receptacle having:
an inlet for receiving fluid to be injected by an injector to be tested;
a target outlet for receiving at least a portion of fluid to be injected through the inlet; and
a runoff outlet for receiving fluid to be injected by the injector that misses the target outlet,
the inlet, the target outlet and the runoff outlet opening into the inner chamber, the target outlet being across from the inlet;
an injector mounting structure configured for mounting the injector to be tested outside of the receptacle;
at least one fluid-quantity measuring device fluidly connected to at least one of the target outlet and the runoff outlet, the at least one fluid-quantity measuring device being configured to measure a quantity of fluid having flowed thereto from the at least one of the target outlet and the runoff outlet;
a testing controller in communication with the at least one fluid-quantity measuring device, the testing controller being configured to:
receive signals from the at least one fluid-quantity measuring device representative of (i) a first quantity of fluid having flowed to the at least one fluid-quantity measuring device via the target outlet, and (ii) a second quantity of fluid having flowed to the at least one fluid-quantity measuring device via one of the runoff outlet and both of the runoff outlet and the target outlet;
based on the first and second quantities, determine a proportion of fluid that has been injected into the target outlet of the receptacle.

2. The injector testing system of claim 1, wherein the at least one of the runoff outlet and both of the runoff outlet and the target outlet is the runoff outlet.

3. The injector testing system of claim 2, wherein the at least one fluid-quantity measuring device includes:

a first fluid-quantity measuring device fluidly connected to the target outlet and configured to measure the first quantity of fluid; and a second fluid-quantity measuring device fluidly connected to the runoff outlet and configured to measure the second quantity of fluid.

4. The injector testing system of claim 3, wherein:

the first fluid-quantity measuring device is a first scale configured to measure a first weight of fluid collected in the first scale;

the first quantity is the first weight;

the second fluid-quantity measuring device is a second scale configured to measure a second weight of fluid collected in the second scale; and the second quantity is the second weight.

5. The injector testing system of claim 4, further comprising a table including a plurality of fluid collectors for collecting fluid flowing out of the receptacle, wherein:

a first one of the fluid collectors fluidly communicates with the target outlet and is fluidly connected to the first scale such as to funnel fluid from the target outlet to the first scale;

a second one of the fluid collectors fluidly communicates with the runoff outlet and is fluidly connected to the second scale such as to funnel fluid from the runoff outlet to the second scale.

6. The injector testing system of claim 5, wherein the testing rig is adjustably mounted to the table such as to align and fluidly communicate (i) the first scale to the target outlet via the first one of the fluid collectors, and (ii) the second scale to the runoff outlet via the second one of the fluid collectors.

7. The injector testing system of claim 6, wherein:

the table comprises a plurality of guiding recesses;

the testing rig comprises a platform, the receptacle and the injector mounting structure being mounted to the platform; and the testing rig is adjustably mounted to the table via a plurality of clamps that slidingly engage the guiding recesses of the table and are clamped to the platform of the testing rig.

8. The injector testing system of claim 5, further comprising:

a tank for containing fluid; and a pump configured to pump fluid from the tank to the injector to be tested.

9. The injector testing system of claim 8, wherein the table comprises an inlet connection, the pump being configured to be fluidly connected to the injector to be tested via the inlet connection of the table.

10. The injector testing system of claim 1, wherein the runoff outlet of the receptacle is located vertically below the target outlet at a lowest point of the inner chamber such that fluid that misses the target outlet flows by gravity to the runoff outlet.

11. The injector testing system of claim 4, further comprising a pump selectively fluidly connected to the first and second scales for purging fluid from the first and second scales, the testing controller being in communication with the pump and being configured to control the pump to selectively purge the first and second scales.

12. The injector testing system of claim 11, wherein:

the testing controller controls the pump to stop purging the first scale when fluid contained in the first scale weighs less than a first weight threshold that is equal to or less than 5% of the first weight; and the testing controller controls the pump to stop purging the second scale when fluid contained in the second scale weighs less than a second weight threshold that is equal to or less than 5% of the second weight.

13. The injector testing system of claim 1, further comprising a compressor adapted for selectively supplying compressed air into the injector to be tested to clear the injector of fluid.

14. The injector testing system of claim 1, further comprising a user interface in communication with the testing controller, the user interface being configured to communicate to a user one or more of the first quantity, the second quantity and the proportion of fluid.

15. The injector testing system of claim 14, further comprising:

a pressure sensor configured to sense a pressure of fluid to be supplied to the injector to be tested;

a temperature sensor configured to sense a temperature of fluid to be supplied to the injector to be tested; and a flow rate sensor configured to sense a flow rate of fluid to be supplied to the injector to be tested, wherein the user interface is configured to display the pressure, the temperature and the flow rate.

16. The injector testing system of claim 1, further comprising:

a cover for selectively enclosing the testing rig; and a fluid mist collector mounted to the cover for extracting fluid mist.

17. The injector testing system of claim 5, further comprising:

a tank for containing fluid;

a pump configured to pump fluid from the first and second scales to the tank;

a first valve fluidly connected between the first one of the fluid collectors and the first scale to selectively direct flow of fluid from the first one of the fluid collectors toward the tank or the first scale;

a second valve fluidly connected between the second one of the fluid collectors and the second scale to selectively direct flow of fluid from the second one of the fluid collectors toward the tank or the second scale;

a third valve fluidly connected between the first scale and the pump to selectively block flow of fluid out of the first scale to the pump; and a fourth valve fluidly connected between the second scale and the pump to selectively block flow of fluid out of the second scale to the pump.

18. The injector testing system of claim 5, wherein:

the testing rig is a first testing rig, the injector testing system comprises a second testing rig comprising:

a second receptacle defining a second inner chamber, the second receptacle having:

a second inlet for receiving fluid to be injected by a second injector to be tested;

a second target outlet for receiving at least a portion of fluid to be injected through the second inlet; and a second runoff outlet for receiving fluid to be injected by the second injector that misses the second target outlet, the second inlet, the second target outlet and the second runoff outlet opening into the second inner chamber, the second target outlet being across from the second inlet;

a second injector mounting structure configured for mounting the second injector to be tested outside of the second receptacle;

the at least one fluid-quantity measuring device includes:

a third scale fluidly connected to the second target outlet and configured to measure a third weight of fluid collected in the third scale; and a fourth scale fluidly connected to the second runoff outlet and configured to measure a fourth weight of fluid collected in the fourth scale;

a third one of the fluid collectors fluidly communicates with the second target outlet and is fluidly connected to the third scale such as to funnel fluid from the second target outlet to the third scale;

a fourth one of the fluid collectors fluidly communicates with the second runoff outlet and is fluidly connected to the fourth scale such as to funnel fluid from the second runoff outlet to the fourth scale.

19. A method of testing an injector, comprising:

positioning the injector to inject fluid towards an inlet and a target outlet of a receptacle, the inlet and target outlet fluidly communicating with an inner chamber of the receptacle, the target outlet being across from the inlet;

injecting fluid via the injector toward the target outlet via the inlet of the receptacle;

measuring a first quantity of fluid passing through the target outlet;

measuring a second quantity of fluid that is one of (i) fluid that misses the target outlet and passes through a runoff outlet of the receptacle, and (ii) both fluid passing through the target outlet and fluid that misses the target outlet and passes through the runoff outlet of the receptacle;

based on the first and second quantities, determining a proportion of fluid that has been injected into the target outlet of the receptacle.

20. An injector testing rig for testing an injector, comprising:

a receptacle defining an inner chamber, the receptacle having:

an inlet for receiving fluid to be injected by the injector;

a target outlet for receiving at least a portion of fluid to be injected through the inlet, the target outlet being located across from the inlet; and a runoff outlet for receiving fluid to be injected by the injector that misses the target outlet, the runoff outlet being disposed vertically below the target outlet; and an injector mounting structure configured for mounting the injector to be tested outside of the receptacle.

21. The injector testing rig of claim 20, wherein the runoff outlet is disposed at a lowest point of the inner chamber.

* * * * *